US012112425B2

(12) United States Patent
Tamura et al.

(10) Patent No.: US 12,112,425 B2
(45) Date of Patent: Oct. 8, 2024

(54) INFORMATION PROCESSING APPARATUS, METHOD OF OPERATING INFORMATION PROCESSING APPARATUS, AND PROGRAM FOR GENERATING VIRTUAL VIEWPOINT IMAGE

(71) Applicant: FUJIFILM Corporation, Tokyo (JP)

(72) Inventors: Kazunori Tamura, Saitama (JP); Takashi Aoki, Saitama (JP); Fuminori Irie, Saitama (JP); Masahiko Miyata, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 101 days.

(21) Appl. No.: 17/846,026

(22) Filed: Jun. 22, 2022

(65) Prior Publication Data
US 2022/0319102 A1    Oct. 6, 2022

Related U.S. Application Data

(63) Continuation of application No. PCT/JP2020/041983, filed on Nov. 10, 2020.

(30) Foreign Application Priority Data

Dec. 26, 2019 (JP) ................................ 2019-237438

(51) Int. Cl.
G06T 15/20       (2011.01)
G06T 7/00        (2017.01)

(52) U.S. Cl.
CPC ............ G06T 15/20 (2013.01); G06T 7/0002 (2013.01); G06T 2207/30168 (2013.01); G06T 2207/30221 (2013.01)

(58) Field of Classification Search
CPC ................... G06T 15/20; G06T 7/0002; G06T 2207/30168; G06T 2207/30221;
(Continued)

(56) References Cited

U.S. PATENT DOCUMENTS 10,970,915 B2 *  4/2021  Hanamoto ............ G06T 15/205
2019/0051035 A1  2/2019  Nishiyama
(Continued)

FOREIGN PATENT DOCUMENTS

JP    2018073105    5/2018
JP    2019036790    3/2019
(Continued)

OTHER PUBLICATIONS

"International Search Report (Form PCT/ISA/210) of PCT/JP2020/041983," mailed on Jan. 26, 2021, with English translation thereof, pp. 1-5.
(Continued)

Primary Examiner — Maurice L. McDowell, Jr.
Assistant Examiner — Donna J. Ricks
(74) Attorney, Agent, or Firm — JCIPRNET

(57) ABSTRACT

An information processing apparatus includes a processor and a memory connected to or incorporated in the processor. The processor acquires reference imaging device information corresponding to a position, an imaging direction, and an angle of view of a reference imaging device, and generates the virtual viewpoint image by using the reference imaging device information as a reference, on a condition that an instruction to start generating a virtual viewpoint image based on a plurality of images obtained by imaging an imaging region with a plurality of imaging devices is given.

14 Claims, 20 Drawing Sheets

(58) Field of Classification Search
CPC ......... H04N 21/2187; H04N 21/23418; H04N 21/235; H04N 21/21805
See application file for complete search history.

(56) References Cited

U.S. PATENT DOCUMENTS

| | | |
|---|---|---|
| 2019/0174108 A1 | 6/2019 | Yano |
| 2019/0238819 A1 | 8/2019 | Furukawa et al. |
| 2019/0253639 A1 | 8/2019 | Takama |
| 2020/0066028 A1* | 2/2020 | Umemura .............. H04N 23/80 |
| 2020/0234495 A1* | 7/2020 | Nakao ................. A63F 13/5258 |
| 2020/0349756 A1 | 11/2020 | Umemura |
| 2021/0160473 A1* | 5/2021 | Uemura ............... H04N 13/111 |
| 2021/0344848 A1 | 11/2021 | Takama |

FOREIGN PATENT DOCUMENTS

| | | |
|---|---|---|
| JP | 2019102056 | 6/2019 |
| JP | 2019106144 | 6/2019 |
| WO | 2018021067 | 2/2018 |

OTHER PUBLICATIONS

"Written Opinion of the International Searching Authority (Form PCT/ISA/237) of PCT/JP2020/041983," mailed on Jan. 26, 2021, with English translation thereof, pp. 1-6.
Office Action of Japan Counterpart Application, with English translation thereof, issued on Jun. 20, 2023, pp. 1-3.

\* cited by examiner

INFORMATION PROCESSING APPARATUS, METHOD OF OPERATING INFORMATION PROCESSING APPARATUS, AND PROGRAM FOR GENERATING VIRTUAL VIEWPOINT IMAGE

CROSS-REFERENCE TO RELATED APPLICATIONS

This application is a continuation application of International Application No. PCT/JP2020/041983, filed Nov. 10, 2020, the disclosure of which is incorporated herein by reference in its entirety. Further, this application claims priority under 35 USC 119 from Japanese Patent Application No. 2019-237438 filed Dec. 26, 2019, the disclosure of which is incorporated by reference herein.

BACKGROUND

1. Technical Field

A technique of the present disclosure relates to an information processing apparatus, a method of operating an information processing apparatus, and a program.

2. Related Art

WO2018/021067A discloses an image processing apparatus including a virtual viewpoint image generation unit that generates a virtual viewpoint image captured at a virtual viewpoint consisting of a virtual viewpoint position and a virtual line-of-sight direction, from a plurality of reference videos captured at a plurality of viewpoint positions in a plurality of line-of-sight directions.

JP2019-036790A discloses an image generation apparatus comprising an image acquisition unit that acquires an image group of a subject imaged from a plurality of different positions, a viewpoint acquisition unit that acquires position information of a virtual viewpoint, a setting unit that sets the resolution of subject shape data according to the distance between the reference point that is the reference for resolution setting and the virtual viewpoint, and a generation unit that generates a virtual viewpoint image of the subject from the virtual viewpoint by using the subject shape data according to the resolution and the image group of the subject.

SUMMARY

One embodiment according to the technique of the present disclosure provides an information processing apparatus, a method of operating an information processing apparatus, and a program capable of reducing a difference in visual field between an image captured by a reference imaging device and a virtual viewpoint image.

A first aspect according to the technique of the present disclosure is an information processing apparatus comprising: a processor; and a memory that is connected to or incorporated in the processor, in which the processor acquires reference imaging device information corresponding to a position, an imaging direction, and an angle of view of a reference imaging device, and on a condition that an instruction to start generating a virtual viewpoint image based on a plurality of images obtained by imaging an imaging region with a plurality of imaging devices is given, generates the virtual viewpoint image by using the reference imaging device information as a reference.

A second aspect according to the technique of the present disclosure is the information processing apparatus according to the first aspect in which in a case where the reference imaging device information is continuously transmitted by a transmission device, the processor generates the virtual viewpoint image by using, as a reference, the reference imaging device information transmitted from the transmission device, on a condition that the instruction is given.

A third aspect according to the technique of the present disclosure is the information processing apparatus according to the first or second aspect in which the processor updates the reference imaging device information each time the processor acquires the reference imaging device information.

A fourth aspect according to the technique of the present disclosure is the information processing apparatus according to any one of the first to third aspects in which the processor acquires image quality information indicating an image quality of a first reference image obtained by imaging the imaging region with the reference imaging device, and determines an image quality of the virtual viewpoint image on the basis of the image quality information on a condition that the instruction is given.

A fifth aspect according to the technique of the present disclosure is the information processing apparatus according to any one of the first to fourth aspects in which the processor outputs a superimposed image in which the virtual viewpoint image is superimposed on a second reference image obtained by imaging the imaging region with the reference imaging device, on a condition that the instruction is given.

A sixth aspect according to the technique of the present disclosure is the information processing apparatus according to the fifth aspect in which the processor gradually changes a ratio between the second reference image and the virtual viewpoint image in the superimposed image.

A seventh aspect according to the technique of the present disclosure is the information processing apparatus according to any one of the first to sixth aspects in which the processor outputs the virtual viewpoint image to a display, and receives a change signal for continuously changing at least one of a viewpoint position, a line-of-sight direction, or an angle of view in the output virtual viewpoint image.

An eighth aspect according to the technique of the present disclosure is the information processing apparatus according to any one of the first to seventh aspects in which the reference imaging device is an imaging device capable of changing at least one of the position, the imaging direction, or the angle of view.

A ninth aspect according to the technique of the present disclosure is the information processing apparatus according to any one of the first to eighth aspects in which the processor acquires the reference imaging device information on the basis of a third reference image obtained by imaging the imaging region with the reference imaging device.

A tenth aspect according to the technique of the present disclosure is the information processing apparatus according to any one of the first to ninth aspects in which the reference imaging device information is the position, the imaging direction, and the angle of view of the reference imaging device.

An eleventh aspect according to the technique of the present disclosure is the information processing apparatus according to any one of the first to tenth aspects in which the reference imaging device is one of the plurality of imaging devices.

A twelfth aspect according to the technique of the present disclosure is the information processing apparatus according to the eleventh aspect in which the reference imaging device is capable of being switched between the plurality of imaging devices.

A thirteenth aspect according to the technique of the present disclosure is the information processing apparatus according to any one of the first to twelfth aspects in which the processor outputs a fourth reference image obtained by imaging the imaging region with the reference imaging device, acquires the reference imaging device information, and generates a virtual viewpoint image corresponding to the fourth reference image by using the reference imaging device information as a reference, on a condition that the instruction is given.

A fourteenth aspect according to the technique of the present disclosure is a method of operating an information processing apparatus including a processor and a memory connected to or incorporated in the processor, the method comprising: acquiring reference imaging device information corresponding to a position, an imaging direction, and an angle of view of a reference imaging device; and on a condition that an instruction to start generating a virtual viewpoint image based on a plurality of images obtained by imaging an imaging region with a plurality of imaging devices is given, generating the virtual viewpoint image by using the reference imaging device information as a reference.

A fifteenth aspect according to the technique of the present disclosure is a program for causing a computer that is applied to an information processing apparatus including a processor and a memory connected to or incorporated in the processor to execute a process comprising: acquiring reference imaging device information corresponding to a position, an imaging direction, and an angle of view of a reference imaging device; and on a condition that an instruction to start generating a virtual viewpoint image based on a plurality of images obtained by imaging an imaging region with a plurality of imaging devices is given, generating the virtual viewpoint image by using the reference imaging device information as a reference.

BRIEF DESCRIPTION OF THE DRAWINGS

Exemplary embodiments of the technology of the disclosure will be described in detail based on the following figures, wherein.

DETAILED DESCRIPTION

An example of an embodiment according to the technique of the present disclosure will be described with reference to the accompanying drawings.

First, the wording used in the following description will be described.

CPU is an abbreviation of "central processing unit". RAM is an abbreviation of "random access memory". DRAM is an abbreviation of "dynamic random access memory". SRAM is an abbreviation of "static random access memory". ROM is an abbreviation of "read only memory". SSD is an abbreviation of "solid state drive". HDD is an abbreviation of "hard disk drive". EEPROM is an abbreviation of "electrically erasable and programmable read only memory". I/F is an abbreviation of "interface". IC is an abbreviation of "integrated circuit". ASIC is an abbreviation of "application specific integrated circuit". PLD is an abbreviation of "programmable logic device". FPGA is an abbreviation of "field-programmable gate array". SoC is an abbreviation of "system-on-a-chip". CMOS is an abbreviation of "complementary metal oxide semiconductor". CCD is an abbreviation of "charge coupled device". EL is an abbreviation of "electro-luminescence". GPU is an abbreviation of "graphics processing unit". LAN is an abbreviation of "local area network". 3D is an abbreviation of "3 dimension". "HMD" is an abbreviation of "head mounted display". USB is an abbreviation of "Universal Serial Bus". fps is an abbreviation of "frame per second". LTE is an abbreviation of "Long Term Evolution". 5G is an abbreviation of "5th generation (wireless technology for digital cellular networks)". TDM is an abbreviation of "time-division multiplexing".

In the description of the present specification, the meaning of "match" includes not only the meaning of complete match but also the meaning of substantial match including errors allowed in design and manufacturing. In the description of the present specification, the meaning of "the same" includes not only the meaning of completely the same but also the meaning of substantially the same including errors allowed in design and manufacturing. In the description of the present specification, the meaning of "straight" includes not only the meaning of a completely straight line but also the meaning of a substantially straight line including errors allowed in design and manufacturing. Also, in the description of the present specification, the meaning of "curved" includes not only the meaning of a completely curved line but also the meaning of a substantially curved line including errors allowed in design and manufacturing.

Figure 1:
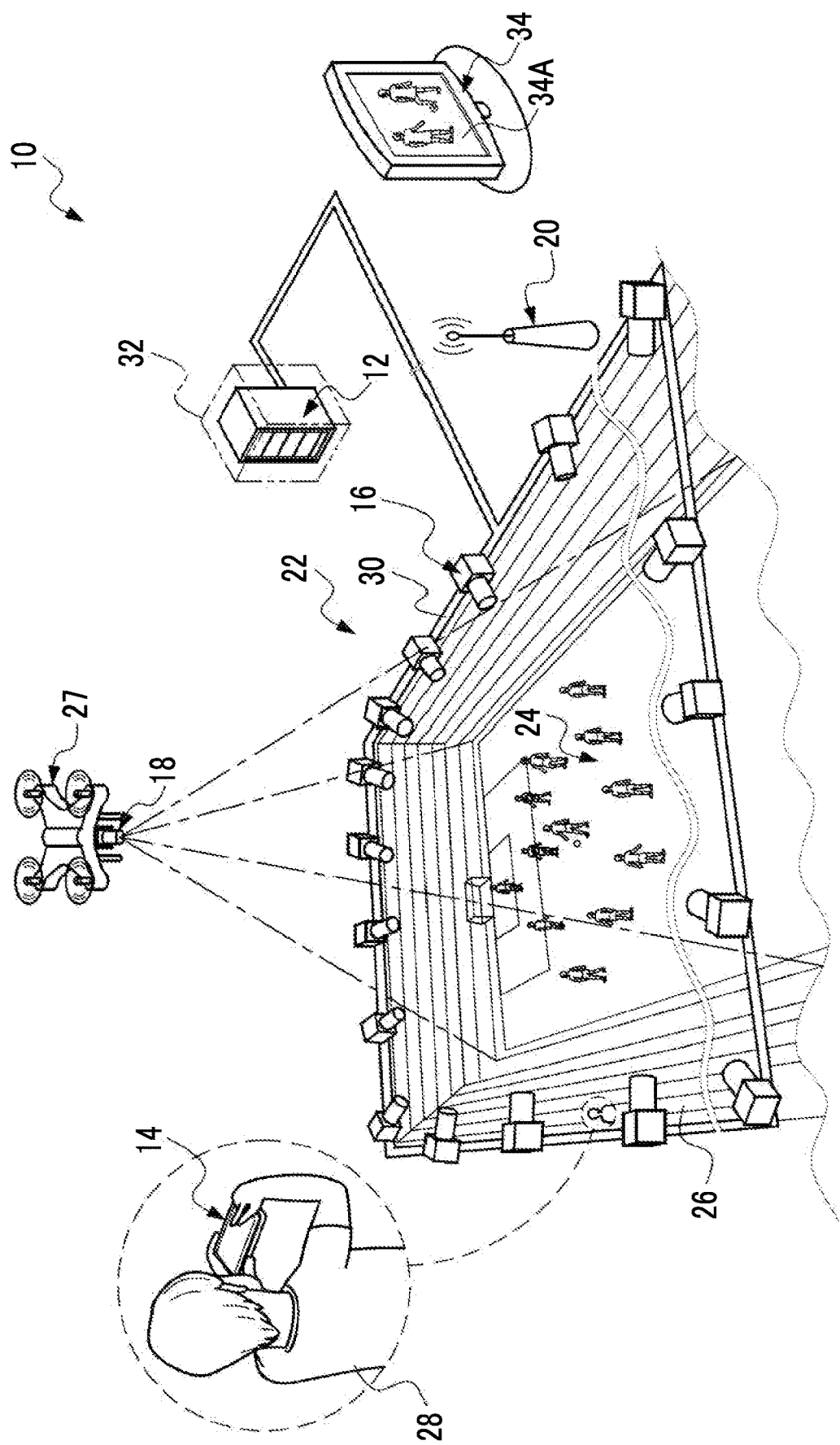
FIG. 1 is a schematic perspective view showing an example of an external configuration of an information processing system.

As shown in FIG. 1 as an example, an information processing system 10 comprises an information processing apparatus 12, a smart device 14, a plurality of imaging devices 16, an imaging device 18, a wireless communication base station (hereinafter, simply referred to as a "base station") 20, and a receiver 34. Here, the "smart device 14" refers to, for example, a portable multifunctional terminal, such as a smartphone, a tablet terminal, a smart watch (watch-type multifunctional terminal), and an HMD-type multifunctional terminal. Here, the information processing apparatus 12 is an example of the "information processing apparatus" according to the technique of the present disclosure. The plurality of imaging devices 16 and the imaging device 18 are an example of the "plurality of imaging devices" according to the technique of the present disclosure. Here, the receiver 34 is described as an example, but the technique of the present disclosure is not limited thereto, and the receiver 34 may be an electronic device with a display (for example, a smart device). In addition, the number of the base stations 20 is not limited to one, and a plurality of base stations 20 may exist. Further, the communication standards used in the base station include a wireless communication standard including an LTE standard and the like, a wireless communication standard including a WiFi (802.11) standard and/or a Bluetooth (registered trademark) standard, and a wired communication standard including a TDM standard and/or an Ethernet (registered trademark) standard.

The imaging devices 16 and 18 each are a device for imaging having a CMOS image sensor, and are equipped with an optical zoom function and/or a digital zoom function. Another type of image sensor, such as a CCD image sensor, may be adopted instead of the CMOS image sensor.

Hereinafter, for convenience of description, in a case where it is not necessary to distinguish between the imaging device 18 and the plurality of imaging devices 16 in the description, the imaging device 18 and the plurality of imaging devices 16 will be referred to as a "plurality of imaging devices" without reference numerals.

The plurality of imaging devices 16 are installed in a soccer stadium 22. Each of the plurality of imaging devices 16 is disposed so as to surround a soccer field 24, and images a region including the soccer field 24 as an imaging region. Here, the region including the soccer field 24 is an example of the "imaging region" according to the technique of the present disclosure. Here, a description is given using, as an example, an aspect in which each of the plurality of imaging devices 16 is disposed so as to surround the soccer field 24, but the technique of the present disclosure is not limited thereto, and the disposition of the plurality of imaging devices 16 is decided according to a virtual viewpoint video requested to be generated by the viewer 28 or the like. The plurality of imaging devices 16 may be disposed so as to surround the entire soccer field 24, or the plurality of imaging devices 16 may be disposed so as to surround a specific part thereof. The imaging device 18 is installed in an unmanned aerial vehicle (for example, a multi-rotorcraft unmanned aerial vehicle), and images a bird's-eye view of the region including the soccer field 24 from the sky, as the imaging region. The imaging region as the bird's-eye view of the region including the soccer field 24 from the sky refers to a surface imaged by the imaging device 18 with respect to the soccer field 24.

The information processing apparatus 12 is installed in a control room 32. The plurality of imaging devices 16 and the information processing apparatus 12 are connected through a LAN cable 30, and the information processing apparatus 12 controls the plurality of imaging devices 16 and acquires images obtained by being captured by each of the plurality of imaging devices 16. Here, the connection using the wired communication method through the LAN cable 30 is described as an example, but the technique of the present disclosure is not limited thereto, and the connection using the wireless communication method may be applied.

A spectator stand 26 is provided in the soccer stadium 22 so as to surround the soccer field 24, and a viewer 28 is seated in the spectator stand 26. The viewer 28 possesses the smart device 14, and the smart device 14 is used by the viewer 28. Here, a description is given using, as an example, an aspect in which the viewer 28 exists in the soccer stadium 22, but the technique of the present disclosure is not limited thereto, and the viewer 28 may exist outside the soccer stadium 22.

The base station 20 transmits and receives various kinds of information to and from the information processing apparatus 12 and the unmanned aerial vehicle 27 through radio waves. That is, the information processing apparatus 12 is connected to the unmanned aerial vehicle 27 through the base station 20 so as to be capable of wireless communication. The information processing apparatus 12 performs wireless communication with the unmanned aerial vehicle 27 through the base station 20 to control the unmanned aerial vehicle 27 and to acquire images obtained by being captured by the imaging device 18, from the unmanned aerial vehicle 27.

The base station 20 transmits various kinds of information to the receiver 34 through wireless communication. The information processing apparatus 12 transmits various videos to the receiver 34 through the base station 20, and the receiver 34 receives various videos transmitted from the information processing apparatus 12 and displays the received various videos on a screen 34A. The receiver 34 is used, for example, for viewing by an unspecified number of spectators and the like. The location where the receiver 34 is installed may be inside the soccer stadium 22, outside the soccer stadium 22 (for example, a public viewing venue), or the like. Here, a description is given using, as an example, an aspect in which various kinds of information are transmitted to the receiver 34 through wireless communication, but the technique of the present disclosure is not limited thereto, and for example, an aspect in which various kinds of information are transmitted to the receiver 34 through wired communication may be adopted.

The information processing apparatus 12 is a device corresponding to a server, and the smart device 14 is a device corresponding to a client terminal with respect to the information processing apparatus 12. The information processing apparatus 12 and the smart device 14 perform wireless communication with each other through the base station 20, whereby the smart device 14 requests the provision of various services of the information processing apparatus 12 and the information processing apparatus 12 provides the smart device 14 with a service corresponding to the request from the smart device 14.

Figure 2:
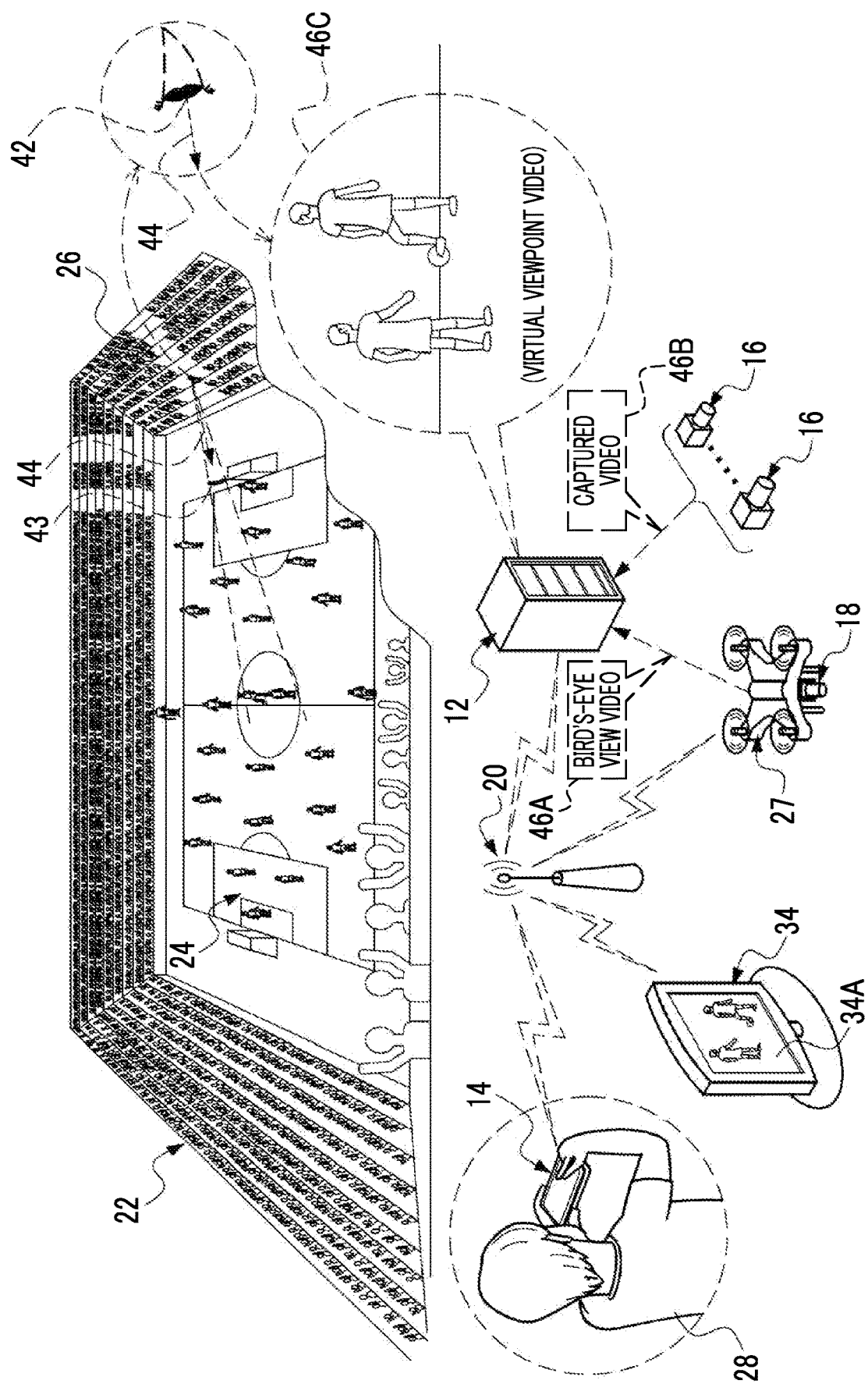
FIG. 2 is a conceptual diagram showing an example of a relationship between an information processing apparatus, a smart device, a receiver, an unmanned aerial vehicle, and an imaging device that are included in the information processing system.

As shown in FIG. 2 as an example, the information processing apparatus 12 acquires, from the unmanned aerial vehicle 27, a bird's-eye view video 46A showing the region including the soccer field 24 as observed from the sky. The bird's-eye view video 46A is a moving image obtained by imaging the bird's-eye view of the region including the soccer field 24 from the sky as the imaging region (hereinafter, also simply referred to as an "imaging region") with the imaging device 18 of the unmanned aerial vehicle 27. Here, a case where the bird's-eye view video 46A is a moving image is described as an example, but the bird's-eye view video 46A is not limited thereto, and the bird's-eye view video 46A may be a still image showing the region including the soccer field 24 as observed from the sky.

The information processing apparatus 12 acquires, from each of the plurality of imaging devices 16, a captured video 46B showing the imaging region as observed from a position of each of the plurality of imaging devices 16. The captured video 46B is a moving image obtained by imaging the imaging region with each of the plurality of imaging devices 16. Here, a case where the captured video 46B is a moving image is described as an example, but the captured video 46B is not limited thereto, and the captured video 46B may be a still image showing the imaging region as observed from a position of each of the plurality of imaging devices 16. Here, the bird's-eye view video 46A and the captured video 46B are an example of the "plurality of images" according to the technique of the present disclosure. Hereinafter, for convenience of description, in a case where it is not necessary to distinguish between the bird's-eye view video 46A and the plurality of captured videos 46B in the description, the bird's-eye view video 46A and the plurality of captured videos 46B will be referred to as a "plurality of original videos" without reference numerals.

The information processing apparatus 12 generates a virtual viewpoint video 46C on the basis of the plurality of original videos. The virtual viewpoint video 46C is a video showing the imaging region in a case where the imaging region is observed from a specific viewpoint position and a specific line-of-sight direction. In the example shown in FIG. 2, the virtual viewpoint video 46C refers to, for example, a virtual viewpoint video showing the imaging region in a case where the soccer field 24 is observed from a viewpoint position 42 and a line-of-sight direction 44 at an angle of view 43 in the spectator stand 26. An example of the virtual viewpoint video 46C includes a moving image using 3D polygons. The viewpoint position 42, the line-of-sight direction 44, and the angle of view 43 are not fixed. That is, the viewpoint position 42, the line-of-sight direction 44, and the angle of view 43 vary depending on instructions from the viewer 28 or the like. Here, a description is given using, as an example, an aspect in which the viewpoint position 42, the line-of-sight direction 44, and the angle of view 43 are not fixed, but the technique of the present disclosure is not limited thereto, and the viewpoint position 42, the line-of-sight direction 44, and the angle of view 43 may be fixed.

The information processing apparatus 12 generates the moving image using 3D polygons by combining a plurality of images (here, as an example, a bird's-eye view image constituting the bird's-eye view video 46A and the plurality of captured images constituting the plurality of captured videos 46B (hereinafter, for convenience of description, in a case where it is not necessary to distinguish between the bird's-eye view image and the plurality of captured images in the description, the bird's-eye view image and the plurality of captured images will be referred to as a "plurality of original images" without reference numerals)) obtained by imaging the imaging region with the plurality of imaging devices. The information processing apparatus 12 generates the virtual viewpoint video corresponding to a case where the imaging region is observed from any position and any direction, on the basis of the generated moving image using 3D polygons. In the present embodiment, the information processing apparatus 12 generates the virtual viewpoint video 46C showing a subject in a case where the subject is observed from the viewpoint position 42 and the line-of-sight direction 44 at the angle of view 43. In other words, the virtual viewpoint video 46C refers to a video corresponding to a video obtained by imaging the subject in the line-of-sight direction 44 as an imaging direction at the angle of view 43 with a virtual imaging device installed at the viewpoint position 42 (hereinafter, also referred to as a "virtual imaging device"). Here, a moving image as the virtual viewpoint video 46C is described as an example, but the technique of the present disclosure is not limited thereto, and a still image may be used. The viewpoint position 42 is an example of the "viewpoint position" according to the technique of the present disclosure. The line-of-sight direction 44 is an example of the "line-of-sight direction" according to the technique of the present disclosure, and the angle of view 43 is an example of the "angle of view" according to the technique of the present disclosure. Further, the virtual viewpoint video 46C is an example of the "virtual viewpoint image" according to the technique of the present disclosure.

Further, here, an aspect in which the bird's-eye view video 46A obtained by being captured by the imaging device 18 is also used to generate the virtual viewpoint video 46C is shown as an example, but the technique of the present disclosure is not limited thereto. For example, only the plurality of captured videos 46B obtained by being captured by each of the plurality of imaging devices 16 may be used to generate the virtual viewpoint video 46C, without using the bird's-eye view video 46A for generating the virtual viewpoint video 46C. That is, the virtual viewpoint video 46C may be generated from only the video obtained by being captured by the plurality of imaging devices 16 without using the video obtained from the imaging device 18. In a case where the video obtained from the imaging device 18 (for example, a drone) is used, a more accurate virtual viewpoint video can be generated.

The information processing apparatus 12 selectively transmits a reference video 46D (see, for example, FIGS. 6 and 7), which will be described later, and the virtual viewpoint video 46C as distribution videos to the smart device 14 and the receiver 34. Hereinafter, for convenience of description, it is not necessary to distinguish between the reference video 46D and the virtual viewpoint video 46C in the description, the reference video 46D and the virtual viewpoint video 46C will be also referred to as a "distribution video".

Figure 3:
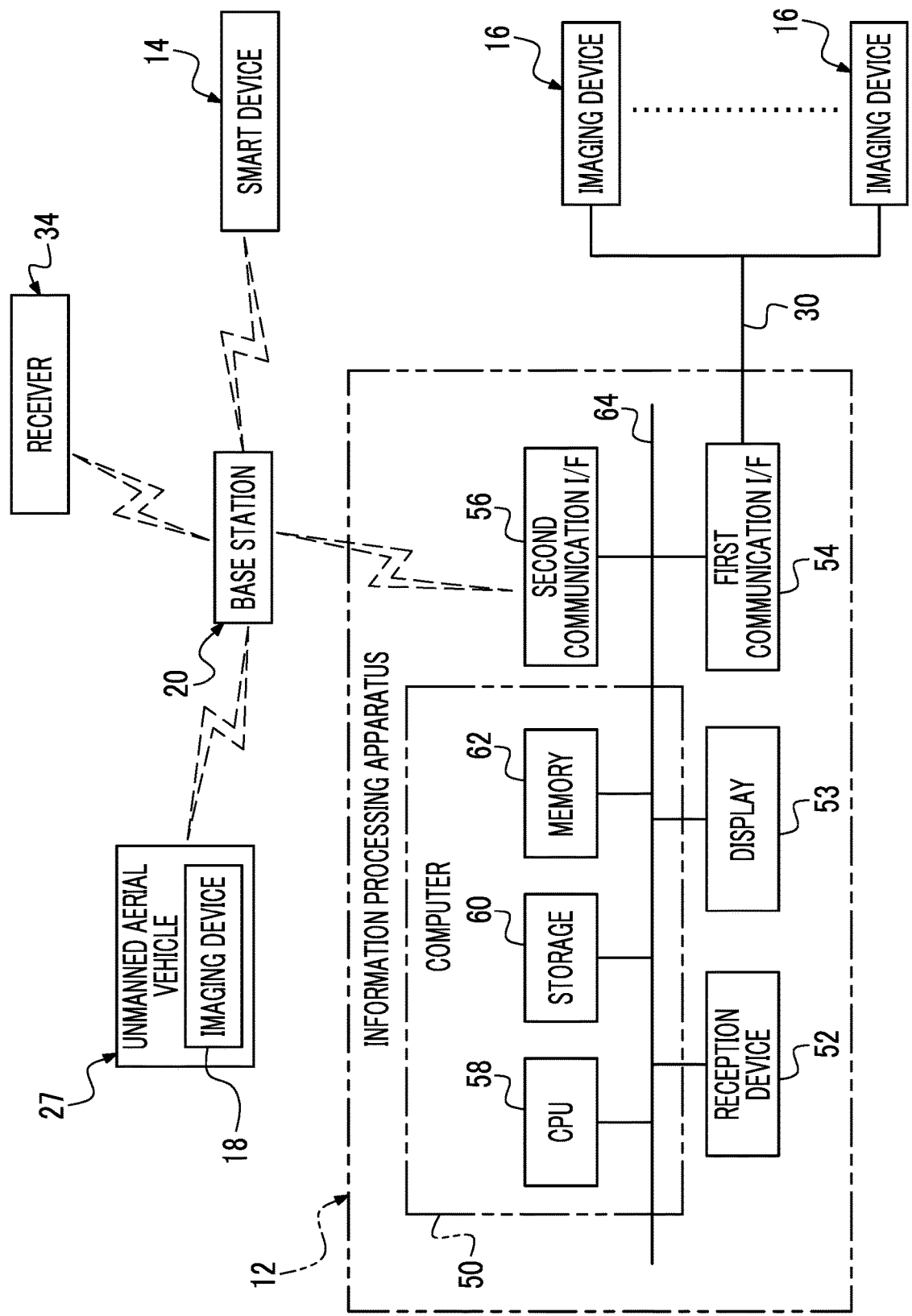
FIG. 3 is a block diagram showing an example of a hardware configuration of an electrical system of the information processing apparatus and an example of a relation between the information processing apparatus and peripheral devices.

As shown in FIG. 3 as an example, the information processing apparatus 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other through a bus 64. In the example shown in FIG. 3, one bus is shown as the bus 64 for convenience of illustration, but a plurality of buses may be used. In addition, the bus 64 may include a serial bus or a parallel bus constituted of a data bus, an address bus, a control bus, and the like. Further, the memory 62 may be incorporated in the CPU 58. The CPU 58 is an example of the "processor" according to the technique of the present disclosure, and the storage 60 and the memory 62 are an example of the "memory" according to the technique of the present disclosure.

The CPU 58 controls the entire information processing apparatus 12. The storage 60 stores various parameters and various programs. The storage 60 is a non-volatile storage device. Here, a flash memory is adopted as an example of the storage 60, but the technique of the present disclosure is not limited thereto, and an EEPROM, an HDD, an SSD, or the like may be adopted. The memory 62 is a storage device. The memory 62 temporarily stores various kinds of information. The memory 62 is used as a work memory by the CPU 58. Here, a DRAM is adopted as an example of the memory 62, but the technique of the present disclosure is not limited thereto, and another type of storage device may be adopted.

The reception device 52 receives an instruction from a user or the like of the information processing apparatus 12. An example of the reception device 52 includes a touch panel, a hard key, and a mouse. The reception device 52 is connected to the bus 64 or the like, and the instruction received by the reception device 52 is acquired by the CPU 58.

The display 53 is connected to the bus 64 and displays various kinds of information under the control of the CPU 58. An example of the display 53 includes a liquid crystal display. The technique of the present disclosure is not limited to the liquid crystal display, another type of display, such as an organic EL display, may be adopted as the display 53.

The first communication I/F 54 is connected to the LAN cable 30. The first communication I/F 54 is realized by, for example, a device having an FPGA. The first communication I/F 54 is connected to the bus 64 and controls the exchange of various kinds of information between the CPU 58 and the plurality of imaging devices 16. For example, the first communication I/F 54 controls the plurality of imaging devices 16 in accordance with the request of the CPU 58. Further, the first communication I/F 54 acquires the captured video 46B (see FIG. 2) obtained by being captured by each of the plurality of imaging devices 16, and outputs the acquired captured video 46B to the CPU 58. Here, the first communication I/F 54 is described as an example of a wired communication I/F, but a wireless communication I/F, such as a high-speed wireless LAN, may be used.

The second communication I/F 56 is connected to the base station 20 so as to be capable of wireless communication. The second communication I/F 56 is realized, for example, by a device having an FPGA. The second communication I/F 56 is connected to the bus 64. The second communication I/F 56 controls the exchange of various kinds of information between the CPU 58 and the unmanned aerial vehicle 27 in a wireless communication method, through the base station 20. In addition, the second communication I/F 56 controls the exchange of various kinds of information between the CPU 58 and the smart device 14 in a wireless communication method, through the base station 20. Further, the second communication I/F 56 controls the transmission of various videos to the receiver 34, which is performed by the CPU 58, in a wireless communication method, through the base station 20. At least one of the first communication I/F 54 or the second communication I/F 56 can be constituted of a fixing circuit instead of an FPGA. Alternatively, at least one of the first communication I/F 54 or the second communication I/F 56 may be a circuit constituted of, for example, an ASIC, an FPGA, and/or a PLD.

Figure 4:
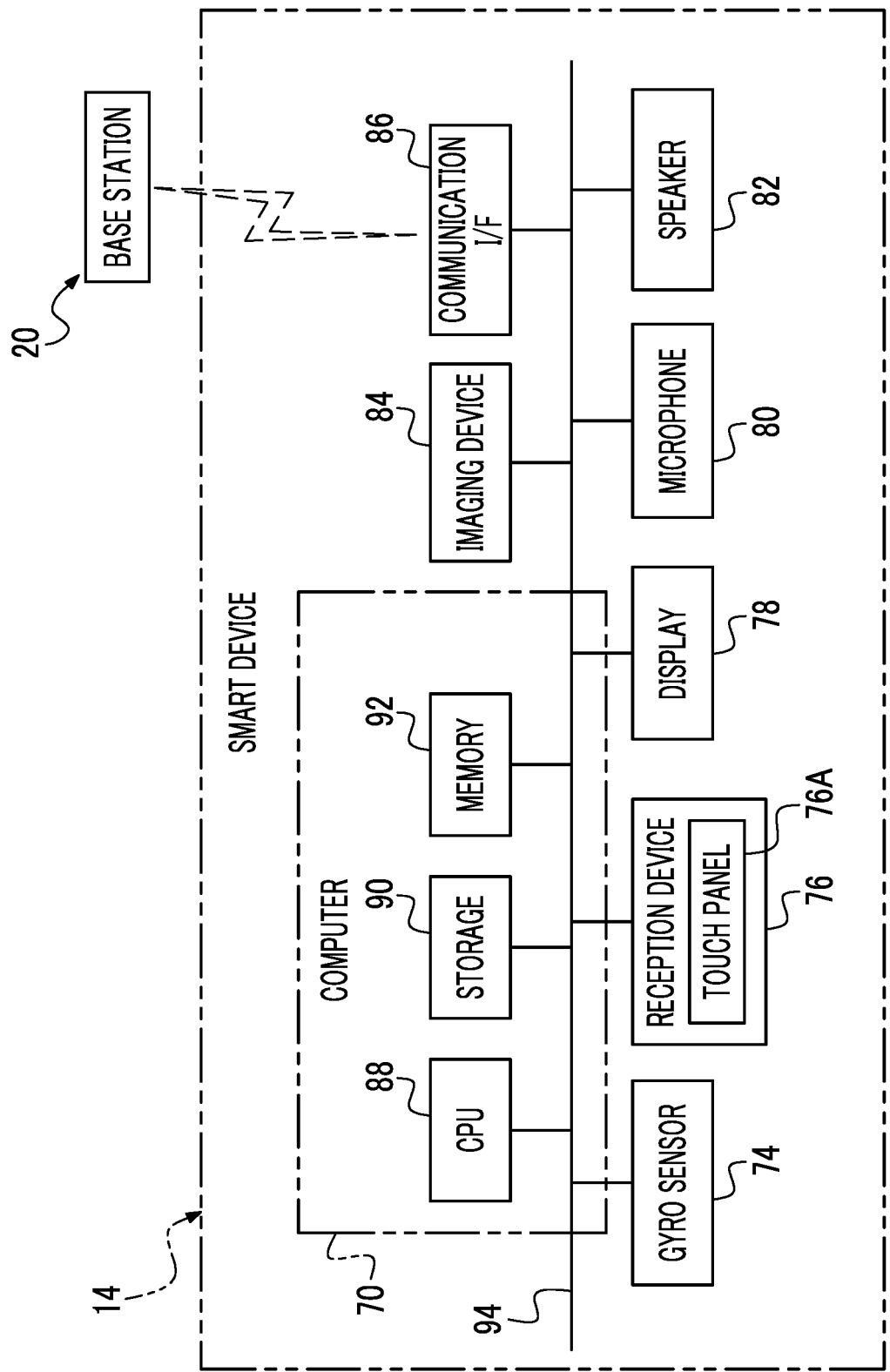
FIG. 4 is a block diagram showing an example of a hardware configuration of an electrical system of the smart device.

As shown in FIG. 4 as an example, the smart device 14 comprises a computer 70, a gyro sensor 74, a reception device 76, a display 78, a microphone 80, a speaker 82, an imaging device 84, and a communication I/F 86. The computer 70 comprises a CPU 88, a storage 90, and a memory 92, and the CPU 88, the storage 90, and the memory 92 are connected to each other through a bus 94. In the example shown in FIG. 4, one bus is shown as the bus 94 for convenience of illustration, but the bus 94 may be a plurality of buses. The bus 94 may be a serial bus or a parallel bus including a data bus, an address bus, a control bus, and the like.

The CPU 88 controls the entire smart device 14. The storage 90 stores various parameters and various programs. The storage 90 is a non-volatile storage device. Here, a flash memory is adopted as an example of the storage 90. The flash memory is merely an example, and examples of the storage 90 include various non-volatile memories, such as a magnetoresistive memory and/or a ferroelectric memory, instead of the flash memory or in combination with the flash memory. Further, the non-volatile storage device may be, for example, an EEPROM, an HDD, and/or an SSD. The memory 92 temporarily stores various kinds of information and is used as a work memory by the CPU 88. An example of the memory 92 includes a RAM, but the technique of the present disclosure is not limited thereto, and another type of storage device may be used.

The gyro sensor 74 measures an angle around the yaw axis of the smart device 14 (hereinafter, also referred to as a "yaw angle"), an angle around the roll axis of the smart device 14 (hereinafter, also referred to as a "roll angle"), and an angle around the pitch axis of the smart device 14 (hereinafter, also referred to as a "pitch angle"). The gyro sensor 74 is connected to the bus 94, and angle information indicating the yaw angle, the roll angle, and the pitch angle measured by the gyro sensor 74 is acquired by the CPU 88 through the bus 94 or the like.

The reception device 76 receives an instruction from a user or the like (here, as an example, the viewer 28) of the smart device 14. An example of the reception device 76 includes a touch panel 76A and a hard key. The reception device 76 is connected to the bus 94, and the instruction received by the reception device 76 is acquired by the CPU 88.

The display 78 is connected to the bus 94 and displays various kinds of information under the control of the CPU 88. An example of the display 78 includes a liquid crystal display. The technique of the present disclosure is not limited to the liquid crystal display, another type of display, such as an organic EL display, may be adopted as the display 78.

The smart device 14 comprises a touch panel/display, and the touch panel/display is realized by the touch panel 76A and the display 78. That is, the touch panel/display is formed by overlapping the touch panel 76A with the display region of the display 78 or by incorporating the touch panel function inside the display 78 ("in-cell" type).

The microphone 80 converts collected sound into an electrical signal. The microphone 80 is connected to the bus 94. The electrical signal obtained by converting the collected sound with the microphone 80 is acquired by the CPU 88 through the bus 94.

The speaker 82 converts the electrical signal into sound. The speaker 82 is connected to the bus 94. The speaker 82 receives the electrical signal output from the CPU 88 through the bus 94, converts the received electrical signal into sound, and outputs the sound obtained by converting the electrical signal, to the outside of the smart device 14.

The imaging device 84 images the subject to acquire an image showing the subject. The imaging device 84 is connected to the bus 94. The image obtained by imaging the subject with the imaging device 84 is acquired by the CPU 88 through the bus 94.

The communication I/F 86 is connected to the base station 20 so as to be capable of wireless communication. The communication I/F 86 is realized, for example, by a device constituted of a circuit (for example, an ASIC, an FPGA, and/or PLD). The communication I/F 86 is connected to the bus 94. The communication I/F 86 controls the exchange of various kinds of information between the CPU 88 and the external device in a wireless communication method, through the base station 20. Here, examples of the "external device" include the information processing apparatus 12.

Figure 5:
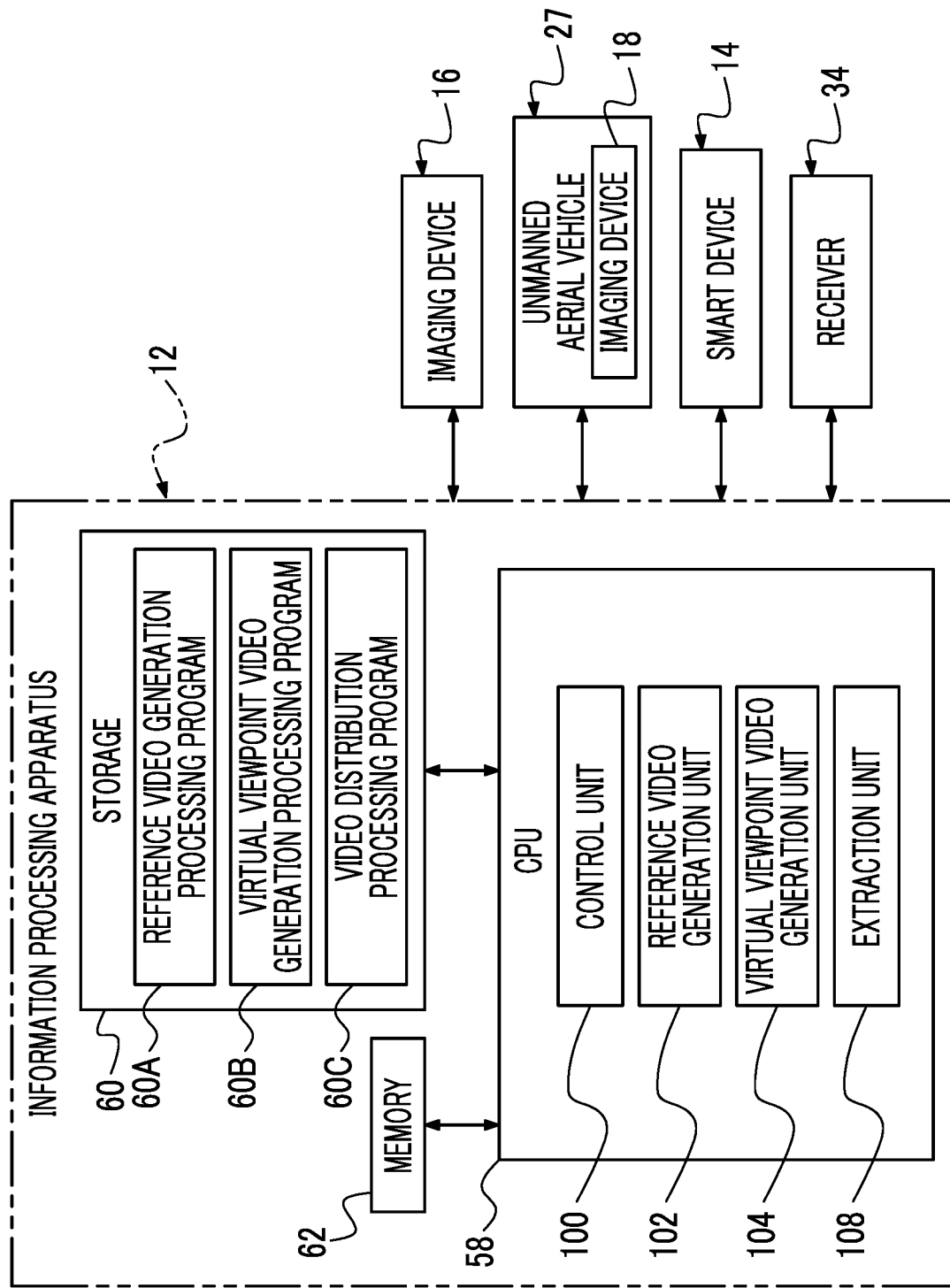
FIG. 5 is a block diagram showing an example of functions of main units of the information processing apparatus.

As shown in FIG. 5 as an example, in the information processing apparatus 12, the storage 60 stores a reference video generation processing program 60A, a virtual viewpoint video generation processing program 60B, and a video distribution processing program 60C. The virtual viewpoint video generation processing program 60B is an example of the "program" according to the technique of the present disclosure. Hereinafter, in a case where it is not necessary to distinguish between the reference video generation processing program 60A, the virtual viewpoint video generation processing program 60B, and the video distribution processing program 60C in the description, the reference video generation processing program 60A, the virtual viewpoint video generation processing program 60B, and the video distribution processing program 60C will be referred to as an "information processing apparatus-side program" without reference numerals.

The CPU 58 reads out the information processing apparatus-side program from the storage 60, and executes the read-out information processing apparatus-side program on the memory 62. The CPU 58 exchanges various kinds of information between the smart device 14, the imaging device 16, and the unmanned aerial vehicle 27 in accordance with the information processing apparatus-side program executed on the memory 62, and transmits various videos to the receiver 34.

The CPU 58 reads out the reference video generation processing program 60A from the storage 60, and executes the read-out reference video generation processing program 60A on the memory 62. The CPU 58 operates as a control unit 100 and a reference video generation unit 102 in accordance with the reference video generation processing program 60A executed on the memory 62. The CPU 58 operates as the control unit 100 and the reference video generation unit 102 to execute reference video generation processing (see FIG. 17), which will be described later.

The CPU 58 reads out the virtual viewpoint video generation processing program 60B from the storage 60, and executes the read-out virtual viewpoint video generation processing program 60B on the memory 62. The CPU 58 operates as the control unit 100 and a virtual viewpoint video generation unit 104 in accordance with the virtual viewpoint video generation processing program 60B executed on the memory 62 to execute virtual viewpoint video generation processing (see FIG. 18), which will be described later.

The CPU 58 reads out the video distribution processing program 60C from the storage 60, and executes the read-out video distribution processing program 60C on the memory 62. The CPU 58 operates as the control unit 100 in accordance with the video distribution processing program 60C executed on the memory 62. The CPU 58 operates as the control unit 100 to execute video distribution processing (see FIG. 19), which will be described later.

An example of the content of the reference video generation processing will be described with reference to FIG. 6. The plurality of original videos obtained by being captured by the plurality of imaging devices are stored in the memory 62 of the information processing apparatus 12. Each of the plurality of original videos is a moving image obtained by being captured at a predetermined frame rate (for example, 30 fps), and is constituted of a plurality of frames of still images. The memory 62 is provided with an area in which a predetermined number of frames (for example, several thousand frames) of still images are stored for each of the plurality of original videos, and the old still image is overwritten with a newly acquired still image. With this, the plurality of original videos for a predetermined time are stored in the memory 62.

In the reference video generation processing, in the information processing apparatus 12, the reception device 52 receives an instruction from a video producer (not shown), and the reception device 52 outputs a reference imaging device identifier 35 in accordance with the received instruction. The reference imaging device identifier 35 is an identifier for specifying one of the plurality of imaging devices.

Specifically, one video is designated from the plurality of original videos by the video producer through the touch panel in a state in which the plurality of original videos are displayed side by side on the display 53. Then, the identifier associated with the imaging device 16 by which the designated captured video 46B is captured or the imaging device 18 by which the designated bird's-eye view video 46A is captured is output from the reception device 52 as the reference imaging device identifier 35. Hereinafter, for convenience of description, the imaging device 16 used for imaging to obtain the designated captured video 46B or the imaging device 18 used for imaging to obtain the designated bird's-eye view video 46A will be referred to as a reference imaging device 17. That is, the reference imaging device 17 is one of the plurality of imaging devices. Here, the reference imaging device 17 is an example of the "reference imaging device" according to the technique of the present disclosure.

The position, the imaging direction, and the angle of view of the reference imaging device 17 can be changed. Further, the reference imaging device 17 can be switched between the plurality of imaging devices. Here, a case where the position, the imaging direction, and the angle of view of the reference imaging device 17 can be changed is described as an example, but the technique of the present disclosure is not limited thereto, and any one or two of the position, the imaging direction, or the angle of view of the reference imaging device 17 may be changeable. Further, here, a case where one of the plurality of imaging devices is designated as the reference imaging device 17 is described as an example, but the technique of the present disclosure is not limited thereto, and an imaging device different from the plurality of imaging devices may be designated as the reference imaging device 17. In this case, the imaging device designated as the reference imaging device 17 may be a movable video camera (for example, a camera for television relay) of which the position, the imaging direction, and the angle of view are operated by a cameraman.

Figure 6:
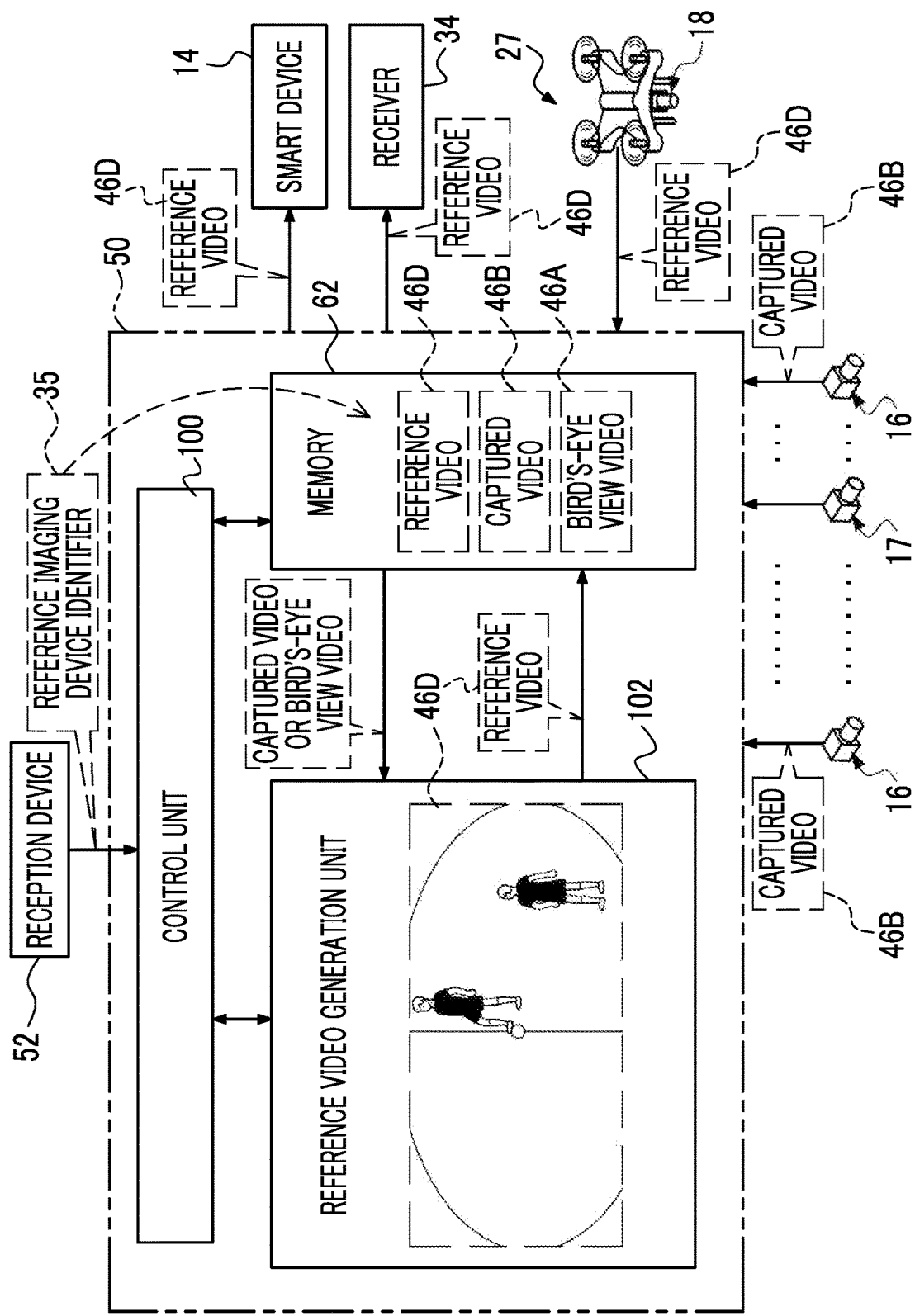
FIG. 6 is a block diagram illustrating an example of a content of reference video generation processing.

In the example shown in FIG. 6, one of the plurality of imaging devices 16 is designated as the reference imaging device 17. The reference video generation unit 102 reads out the captured video 46B obtained by imaging the soccer field 24 with the reference imaging device 17 from the memory 62, and superimposes information indicating the match status (for example, scores, player information, and/or remaining time in the match) on the read-out captured video 46B to generate the reference video 46D. Here, the "reference video 46D" is, for example, a live broadcast video. The reference video 46D is an example of the "first reference image", the "second reference image", the "third reference image", and the "fourth reference image" according to the technique of the present disclosure.

Here, the reference video 46D is generated on the basis of the captured video 46B obtained by being captured by the imaging device 16 designated by the reference imaging device identifier 35, but the captured video 46B itself may be adopted as the reference video 46D. Further, the imaging device 18 may be designated as the reference imaging device 17 instead of the imaging device 16. In this case, the reference video 46D is generated by the reference video generation unit 102 on the basis of the bird's-eye view video 46A.

The reference video generation unit 102 causes the memory 62 to store the generated reference video 46D. Here, the reference video 46D is a moving image that can be displayed at a predetermined frame rate (for example, 30 fps). The control unit 100 reads out the reference video 46D from the memory and outputs the read-out reference video 46D to the receiver 34 through the second communication I/F 56 and the base station 20. Further, the control unit 100 also outputs the reference video 46D to the smart device 14 in a case where a virtual viewpoint video generation instruction 107 (see FIGS. 7 and 8), which will be described later, is not received. In this case, the reference video 46D is displayed on the display 78 (see FIG. 8).

Figure 7:
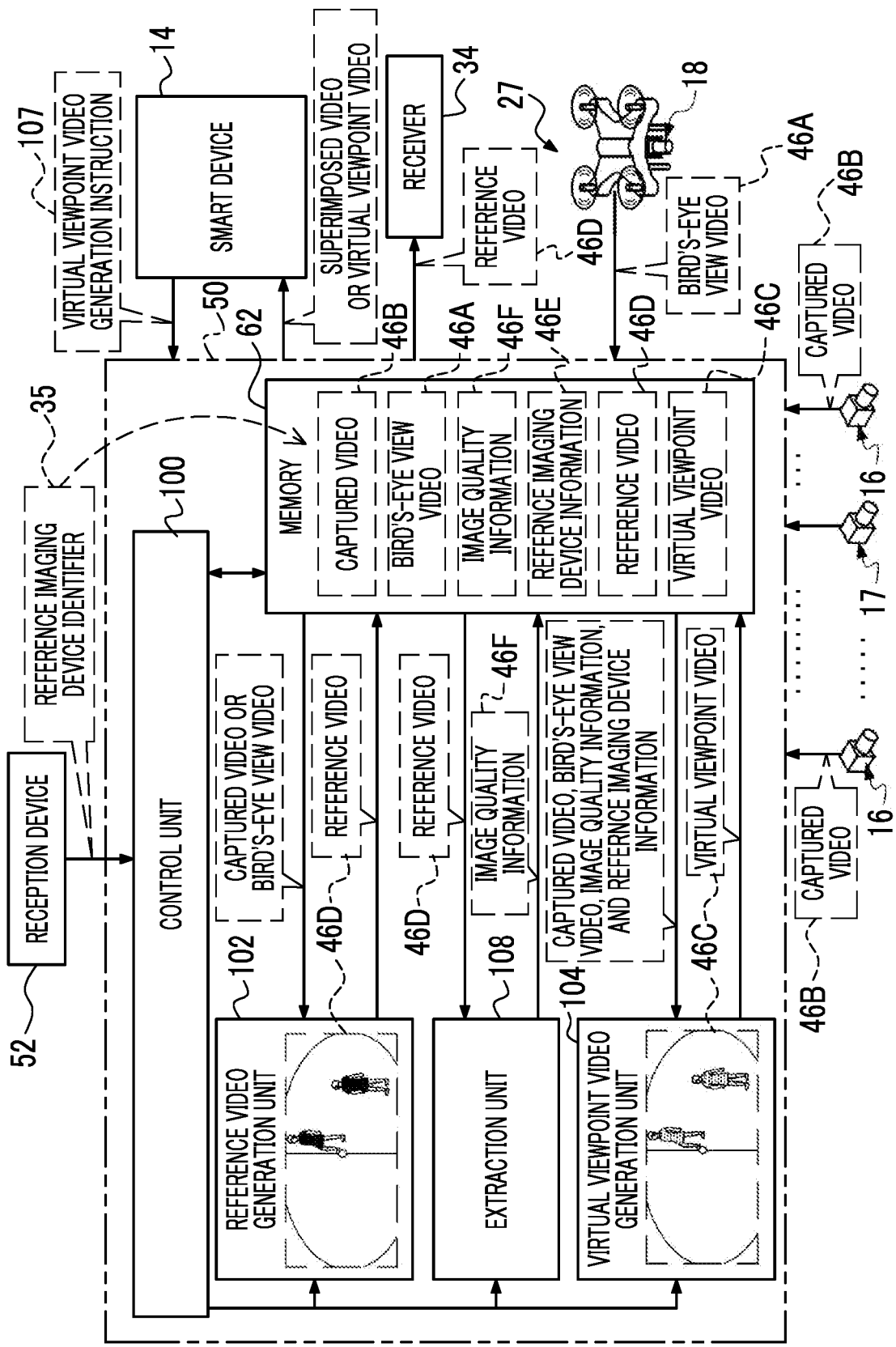
FIG. 7 is a block diagram illustrating an example of a content of virtual viewpoint video generation processing.

Next, an example of the content of the virtual viewpoint video generation processing will be described with reference to FIG. 7. The touch panel 76A of the smart device 14 receives the virtual viewpoint video generation instruction 107 (see FIG. 8) from the viewer 28. The control unit 100 acquires the virtual viewpoint video generation instruction 107 received by the touch panel 76A. In the virtual viewpoint video generation instruction 107, for example, an instruction button 106 (see FIG. 8) displayed on the display 78 is turned on by the viewer 28 who is viewing the reference video 46D displayed on the display 78 of the smart device 14 through the touch panel 76A. The virtual viewpoint video generation instruction 107 is an example of the "instruction" according to the technique of the present disclosure.

The virtual viewpoint video generation instruction 107 is an instruction to start generating the virtual viewpoint video 46C based on the plurality of original videos obtained by imaging the soccer field 24 with the plurality of imaging devices. For example, the virtual viewpoint video generation instruction 107 is given to the smart device 14 by the viewer 28 in a case where the information processing apparatus 12 is instructed to start generating the virtual viewpoint video 46C and to display the generated virtual viewpoint video 46C on the display 78 by the virtual viewpoint video generation instruction 107.

The control unit 100 acquires reference imaging device information 46E. The reference imaging device information 46E is the position, the imaging direction, and the angle of view of the reference imaging device 17. Here, the position, the imaging direction, and angle of view of the reference imaging device 17 are described as an example of the reference imaging device information 46E, but the technique of the present disclosure is not limited thereto, and a position close to the position of the reference imaging device 17, a direction close to the imaging direction of the reference imaging device 17, an angle of view close to the angle of view of the reference imaging device 17 may be used, and information corresponding to the position, the imaging direction, and angle of view of the reference imaging device 17 need only be used.

Each of the plurality of imaging devices continuously transmits imaging device information corresponding to the own position, imaging direction, and angle of view thereof in the soccer field 24. The control unit 100 receives the imaging device information transmitted by the plurality of imaging devices and causes the memory 62 to store the received imaging device information. Further, the control unit 100 reads out, from the memory 62, the imaging device information transmitted by the reference imaging device 17, which is designated from among the plurality of imaging devices, as the reference imaging device information 46E, thereby acquiring the reference imaging device information 46E. The reference imaging device information 46E is an example of the "reference imaging device information" according to the technique of the present disclosure. Further, the reference imaging device 17 is an example of the "transmission device" according to the technique of the present disclosure. Further, here, "continuously transmitting the imaging device information" means that the imaging device information is transmitted a plurality of times. The transmission interval of the imaging device information may or may not be constant.

The control unit 100 operates an extraction unit 108. The extraction unit 108 reads out the reference video 46D from the memory 62 and acquires image quality information 46F indicating the image quality of the reference video 46D. The image quality information 46F acquired by the extraction unit 108 is stored in the memory 62. The image quality information 46F includes, for example, the resolution, brightness, and contrast of the image. The image quality information 46F is an example of the "image quality information" according to the technique of the present disclosure.

Further, the control unit 100 operates the virtual viewpoint video generation unit 104 on a condition that the virtual viewpoint video generation instruction 107 is given. The control unit 100 reads out the captured video 46B, the bird's-eye view video 46A, the image quality information 46F, and the reference imaging device information 46E from the memory 62 and outputs the captured video 46B, the bird's-eye view video 46A, the image quality information 46F, and the reference imaging device information 46E to the virtual viewpoint video generation unit 104.

The virtual viewpoint video generation unit 104 combines the plurality of original images constituting the plurality of original videos to generate the virtual viewpoint video 46C using 3D polygons by using the reference imaging device information 46E as a reference, on a condition that the virtual viewpoint video generation instruction 107 is given. The virtual viewpoint video 46C is a video corresponding to the reference video 46D. For example, the virtual viewpoint video 46C is obtained by generating, as the virtual viewpoint video 46C, the video obtained by imaging the soccer field 24 from the same viewpoint position 42 and the same line-of-sight direction 44 at the same angle of view 43 as the position, the imaging direction, and the angle of view included in the reference imaging device information 46E. That is, the virtual imaging device matches the reference imaging device 17, and the viewpoint position 42, the line-of-sight direction 44, and the angle of view 43 of the virtual viewpoint video 46C match the position, the imaging direction, and the angle of view of the reference imaging device 17.

Further, the virtual viewpoint video generation unit 104 determines the image quality of the virtual viewpoint video 46C to be generated on the basis of the image quality information 46F, on a condition that the virtual viewpoint video generation instruction 107 is given. For example, the virtual viewpoint video generation unit 104 makes the resolution, brightness, and contrast of the virtual viewpoint video 46C to be generated match the resolution, brightness, and contrast included in the image quality information 46F. Here, a description is given using, as an example, an aspect in which the resolution, brightness, and contrast of the virtual viewpoint video 46C match the resolution, brightness, and contrast included in the image quality information 46F, but the technique of the present disclosure is not limited thereto, and the resolution, brightness, and contrast of the virtual viewpoint video 46C may be made close to the resolution, brightness, and contrast included in the image quality information 46F. The virtual viewpoint video generation unit 104 causes the memory 62 to store the generated virtual viewpoint video 46C.

Figure 8:
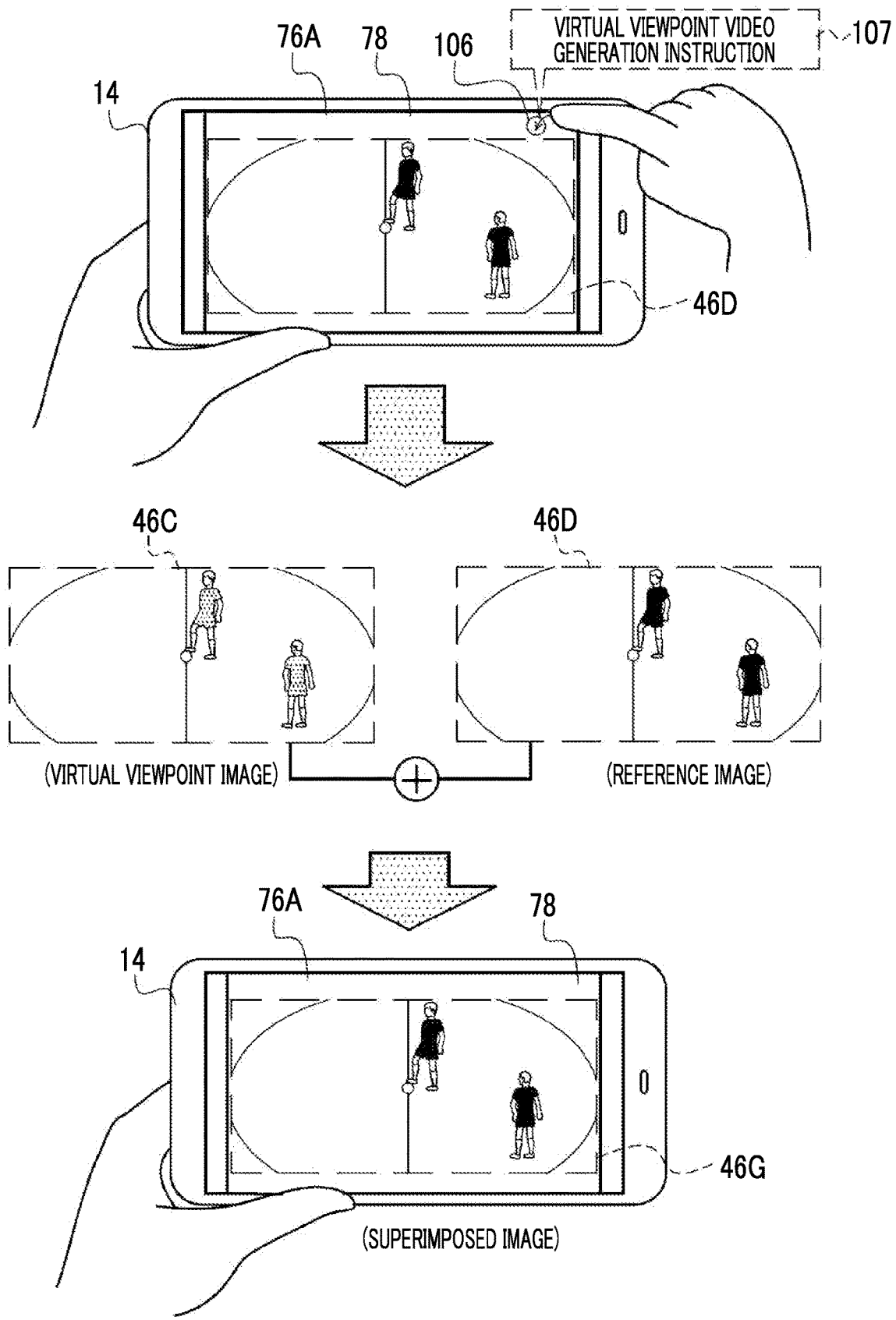
FIG. 8 is a conceptual diagram provided for illustrating an example of a display change that occurs in a case where display of the smart device is switched from a reference video to a virtual viewpoint video.

Next, an aspect in which the virtual viewpoint video 46C is displayed on the display 78 of the smart device 14 will be described. As shown in FIG. 8 as an example, the instruction button 106 is displayed on the upper part of the display 78 while the reference video 46D is displayed on the display 78. In a case where the viewer 28 touches the instruction button 106 from the touch panel 76A, the virtual viewpoint video generation instruction 107 is acquired from the smart device 14 by the information processing apparatus 12.

The control unit 100 operates the virtual viewpoint video generation unit 104 to generate the virtual viewpoint video 46C, as described above, on a condition that the virtual viewpoint video generation instruction 107 is given. The control unit 100 reads out the reference video 46D obtained by the reference imaging device 17 and the virtual viewpoint video 46C generated using the reference imaging device information 46E as a reference, from the memory 62. The control unit 100 generates a superimposed video 46G in which the reference video 46D and the virtual viewpoint video 46C are superimposed. Specifically, the superimposed video 46G is a video in which the virtual viewpoint video 46C is superimposed on the reference video 46D. The control unit 100 outputs the superimposed video 46G to the smart device 14 through the second communication I/F 56 and the base station 20. The superimposed video 46G is displayed on the display 78 of the smart device 14. The superimposed video 46G is an example of the "superimposed image" according to the technique of the present disclosure.

Figure 9:
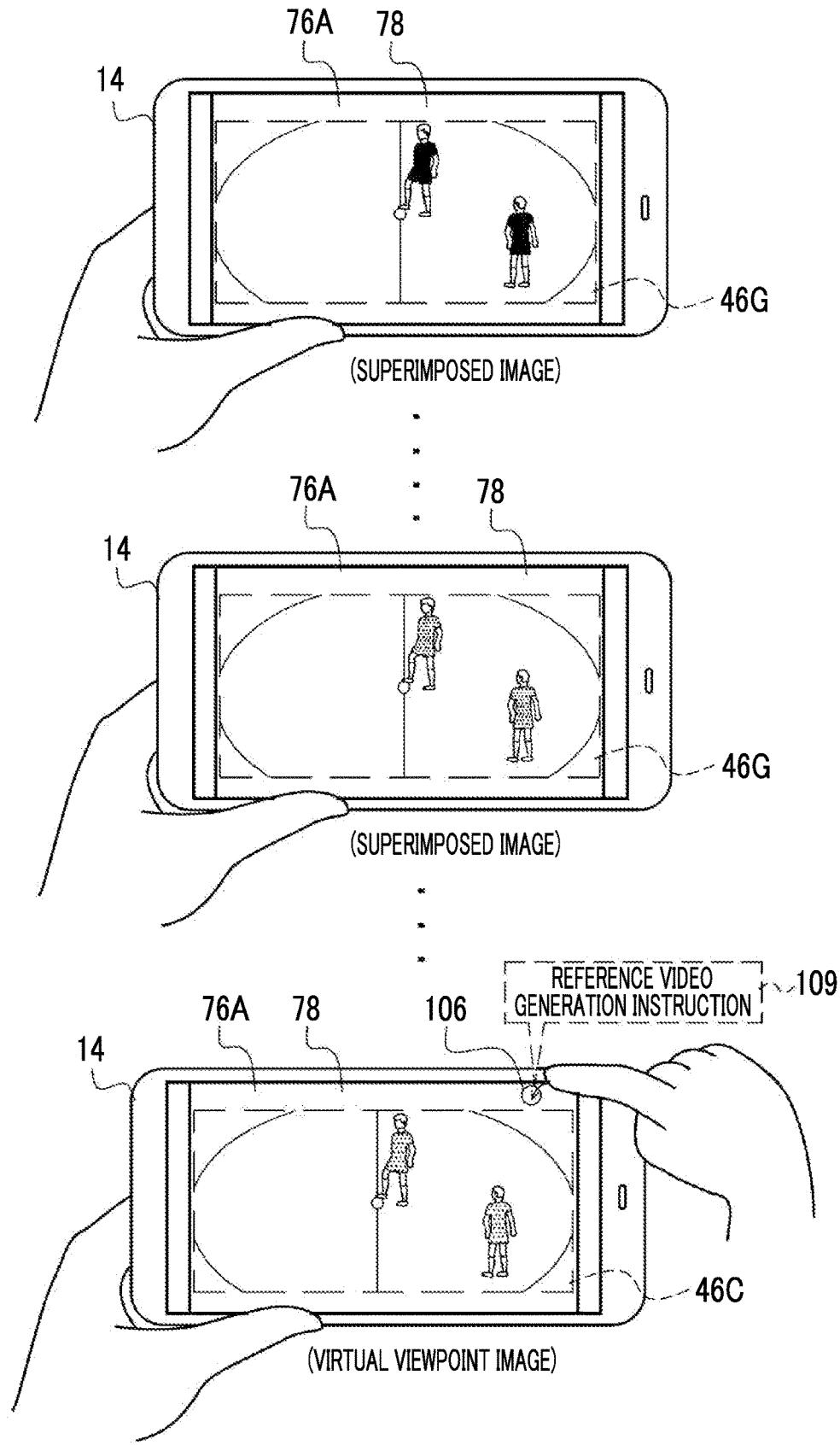
FIG. 9 is a conceptual diagram provided for illustrating an example of a display change that occurs after the display of the smart device is switched to the virtual viewpoint video.

Further, the control unit 100 gradually changes the ratio between the reference video 46D and the virtual viewpoint video 46C in the superimposed video 46G. As shown in FIG. 9 as an example, after receiving the virtual viewpoint video generation instruction 107, the control unit 100 superimposes a reference image and the virtual viewpoint image at a ratio of, for example, 9:1 to generate the superimposed image, and outputs the generated superimposed image to the smart device 14. Here, the ratio refers to, for example, the ratio of the average pixel value of the reference image in the superimposed video 46G and the average pixel value of the virtual viewpoint image in the superimposed video 46G. In other words, here, the ratio refers to the ratio of the degree occupied by the reference image and the degree occupied by the virtual viewpoint image in a pixel unit of the superimposed video 46G. Further, here, the reference image is images for one frame constituting the reference video 46D. The virtual viewpoint image is images for one frame constituting the virtual viewpoint video 46C. The ratio is an example of the "ratio" according to the technique of the present disclosure.

The superimposed image generated at a ratio of 9:1 by the control unit 100 is output to the smart device 14. For example, in a case where the output frame rate of the superimposed video 46G and the virtual viewpoint video 46C on the smart device 14 is 30 fps, the control unit 100 outputs the superimposed images to the smart device 14 while changing the ratio in a three-frame unit. For example, first, the control unit 100 outputs the superimposed images for three frames generated at a ratio of 9:1, to the smart device 14.

Subsequently, the control unit 100 generates the superimposed images for three frames that are generated by superimposing the reference image and the virtual viewpoint image at a ratio of 8:2, and outputs the superimposed images to the smart device 14. After that, the control unit 100 outputs the superimposed images generated by gradually changing the ratio of the reference image to the virtual viewpoint image to 7:3, 6:4, . . . , 1:9, to the smart device 14 by three frames. After that, the control unit 100 outputs the virtual viewpoint video 46C constituted of the virtual viewpoint image to the smart device 14.

For example, alpha blending is applied to superimpose the reference image and the virtual viewpoint image. The alpha blending is a technique of combining two images according to a coefficient (α value). The α value is a value in the range of 0 to 1, the image in which the a value is set to 1 is fully opaque, and the image in which the α value is set to 0 is fully transparent. Therefore, in a case where the reference image and the virtual viewpoint image are superimposed at a ratio of 9:1, for example, the α value of the reference image is set to 0.9 and the a value of the virtual viewpoint image is set to 0.1.

In the example shown in FIG. 9, the smart device 14 drawn in the upper part of FIG. 9 is an aspect at the timing when the instruction button 106 is touched, and the display 78 displays the superimposed image generated by superimposing the reference image and the virtual viewpoint image at a ratio of 9:1. The smart device 14 drawn in the middle of FIG. 9 is an aspect at a timing when, for example, 0.5 seconds are passed after the instruction button 106 is touched, and the display 78 displays the superimposed image generated by superimposing the reference image and the virtual viewpoint image at a ratio of 5:5. The smart device 14 drawn at the lower part of FIG. 9 is an aspect at a timing when, for example, 1.0 second is passed after the instruction button 106 is touched, and the display of the display 78 is switched from the superimposed image to the virtual viewpoint image. In this way, the display of the smart device 14 is gradually changed from the reference video 46D to the virtual viewpoint video 46C by way of the superimposed video over 1 second.

In a case where the virtual viewpoint video 46C is displayed on the display 78, the instruction button 106 is displayed on the upper part of the display 78. The instruction button 106 is a button operated in a case where the display of the display 78 is changed from the virtual viewpoint video 46C to the reference video 46D. In a case where the viewer 28 touches the instruction button 106 from the touch panel 76A, a reference video generation instruction 109 is acquired from the smart device 14 by the information processing apparatus 12. The control unit 100 stops the generation and output of the virtual viewpoint video 46C and outputs the reference video 46D to the smart device 14, on a condition that the reference video generation instruction 109 is given.

Figure 10:
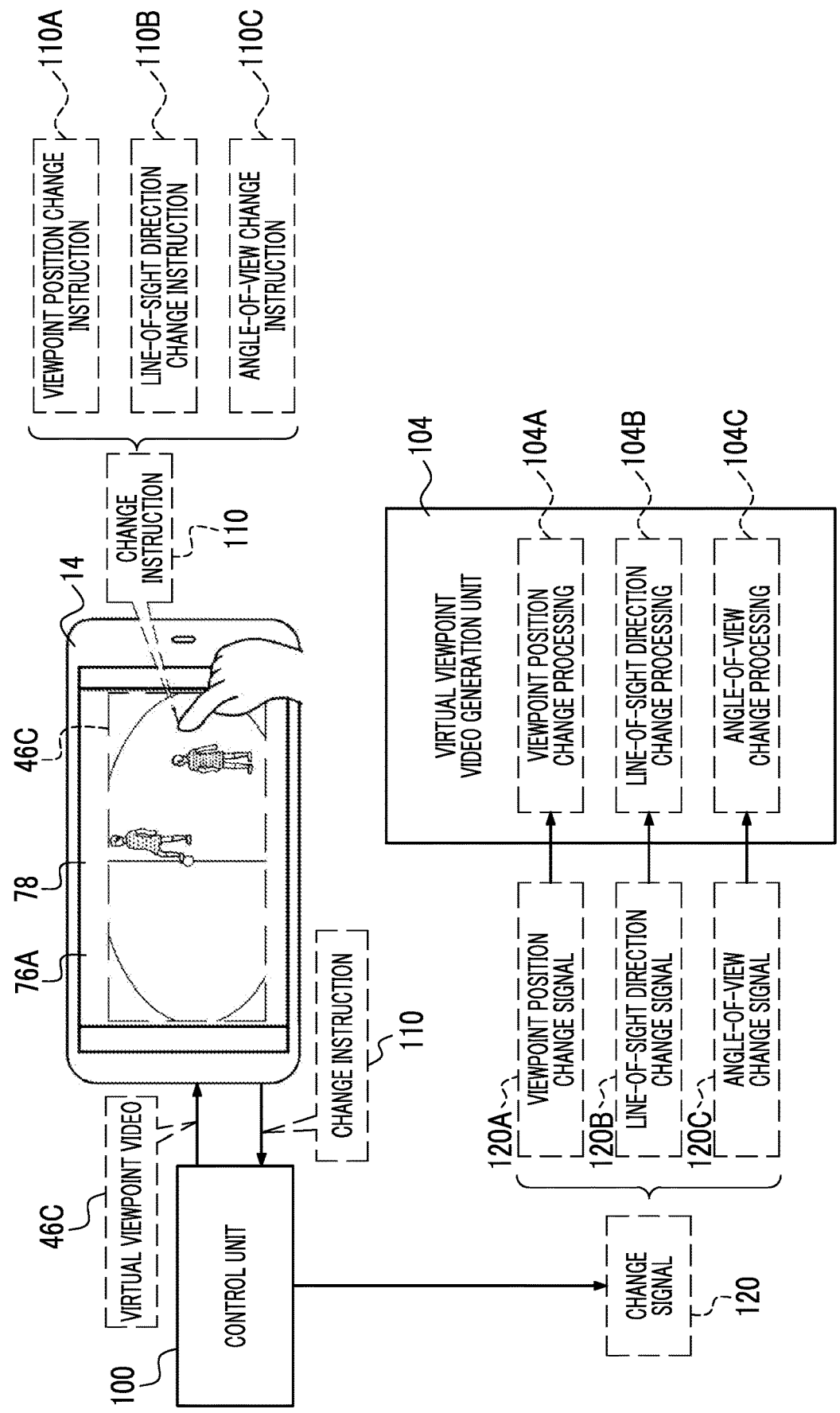
FIG. 10 is a conceptual diagram provided for illustrating an example of a content of a change instruction issued from a user while the virtual viewpoint video is displayed and a change processing content performed in response to the change instruction.

As shown in FIG. 10 as an example, the control unit 100 outputs the virtual viewpoint video 46C to the display 78 of the smart device 14, and receives a change signal 120 for continuously changing at least one of the viewpoint position 42, the line-of-sight direction 44, or the angle of view 43 in the output virtual viewpoint video 46C. Here, the display 78 is an example of the "display" according to the technique of the present disclosure. The change signal 120 is an example of the "change signal" according to the technique of the present disclosure.

In the virtual viewpoint video 46C displayed on the display 78, a change instruction 110 from the viewer 28 is received by the touch panel 76A. The change instruction 110 is roughly classified into a viewpoint position change instruction 110A for changing the viewpoint position 42, a line-of-sight direction change instruction 110B for changing the line-of-sight direction 44, and an angle-of-view change instruction 110C for changing the angle of view 43. The change instruction 110 received by the touch panel 76A is output from the smart device 14 to the control unit 100.

The control unit 100 generates the change signal 120 indicating the change instruction 110 input from the smart device 14. The change signal 120 is roughly classified into a viewpoint position change signal 120A indicating the viewpoint position change instruction 110A, a line-of-sight direction change signal 120B indicating the line-of-sight direction change instruction 110B, and an angle-of-view change signal 120C indicating the angle-of-view change instruction 110C. The change signal 120 is output from the control unit 100 to the virtual viewpoint video generation unit 104.

The virtual viewpoint video generation unit 104 executes viewpoint position change processing 104A for changing the viewpoint position 42 in a case where the viewpoint position change signal 120A is input from the control unit 100. The virtual viewpoint video generation unit 104 executes line-of-sight direction change processing 104B for changing the line-of-sight direction 44 in a case where the line-of-sight direction change signal 120B is input from the control unit 100. The virtual viewpoint video generation unit 104 executes angle-of-view change processing 104C for changing the angle of view 43 in a case where the angle-of-view change signal 120C is input from the control unit 100.

Figure 11:
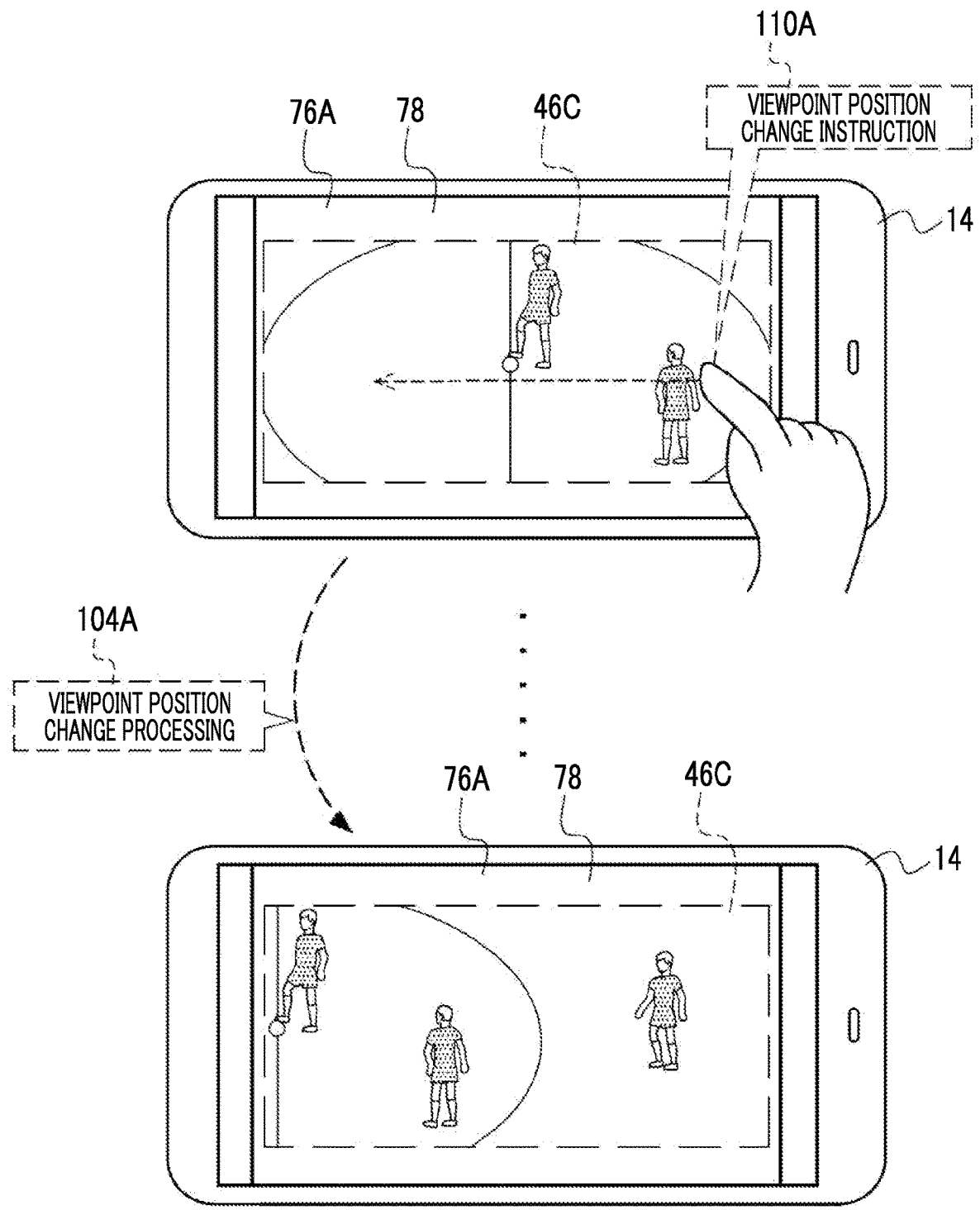
FIG. 11 is a conceptual diagram provided for illustrating an example of an instruction method of a viewpoint position change instruction and viewpoint position change processing.

As shown in FIG. 11 as an example, the viewpoint position change instruction 110A is an instruction for changing the viewpoint position 42 of the virtual viewpoint video 46C. The viewpoint position change instruction 110A is received by the touch panel 76A in a case where the viewer 28 slides his/her finger in a straight line on the touch panel 76A. For example, as shown in the smart device 14 drawn at the upper part of FIG. 11, the viewer 28 slides his/her finger on the touch panel 76A in the direction of a dotted arrow to give the viewpoint position change instruction 110A to the smart device 14.

The virtual viewpoint video 46C displayed on the smart device 14 drawn in the upper part of FIG. 11 is a video captured by the virtual imaging device disposed at a viewpoint position 42A. In a case where the viewpoint position 42A of the virtual imaging device is moved to a viewpoint position 42B, the viewer 28 performs a swipe operation of continuously sliding his/her finger in the direction opposite to the movement direction of the viewpoint position on the touch panel 76A, to give the viewpoint position change instruction 110A to the smart device 14.

Figure 12:
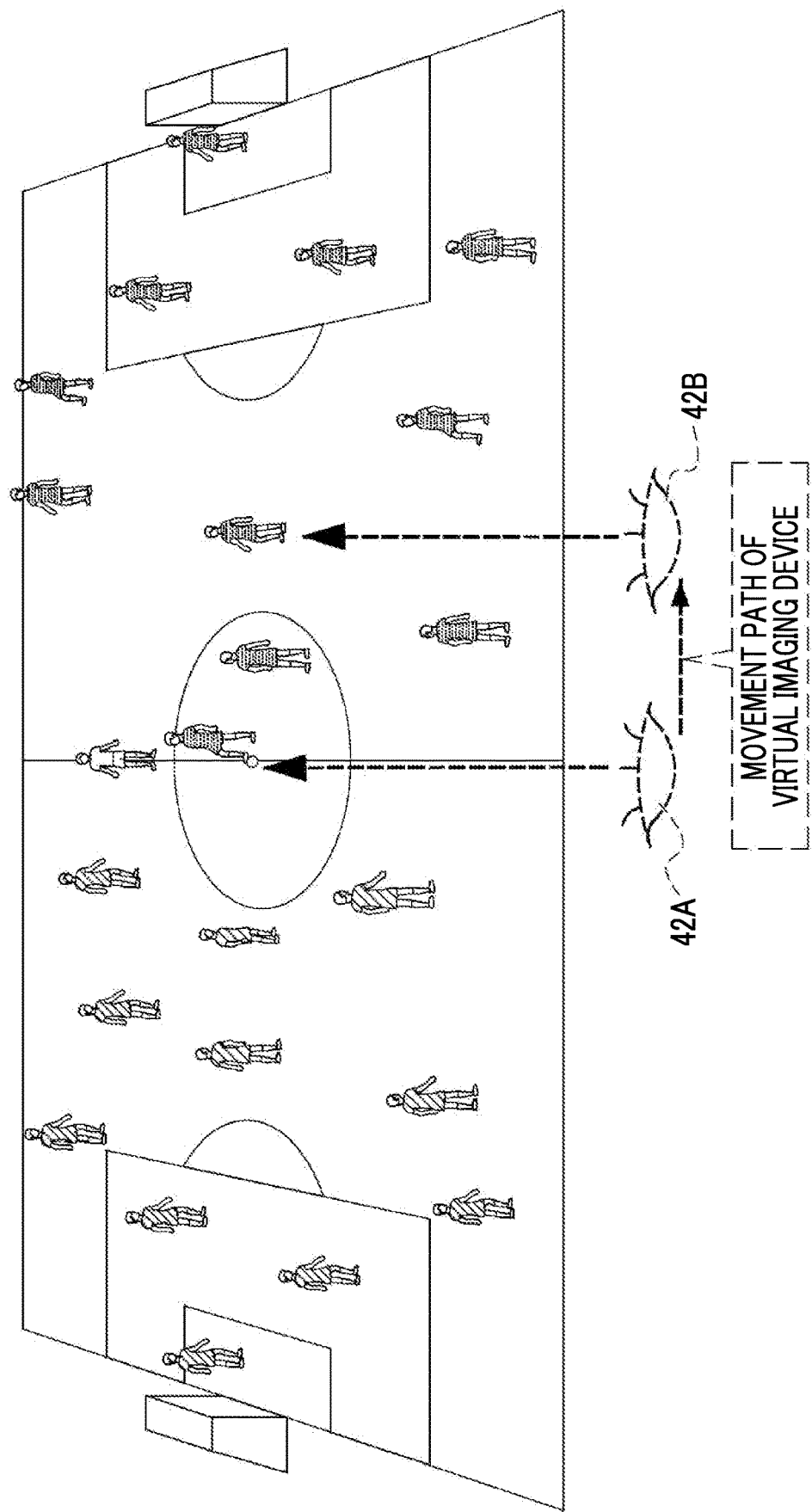
FIG. 12 is a conceptual diagram provided for illustrating an example of a camera path of a virtual imaging device in the viewpoint position change processing.

In this way, in a case where the viewpoint position change instruction 110A is given to the smart device 14, the viewpoint position change processing 104A is performed by the virtual viewpoint video generation unit 104 as described above. In a case where the viewpoint position change processing 104A is performed by the virtual viewpoint video generation unit 104, the virtual imaging device is moved from the viewpoint position 42A to the viewpoint position 42B as shown in FIG. 12 as an example. The virtual viewpoint video 46C generated using the viewpoint position 42B as a reference by the virtual viewpoint video generation unit 104 is obtained by being virtually captured by a virtual imaging device disposed at the viewpoint position 42B.

Figure 13:
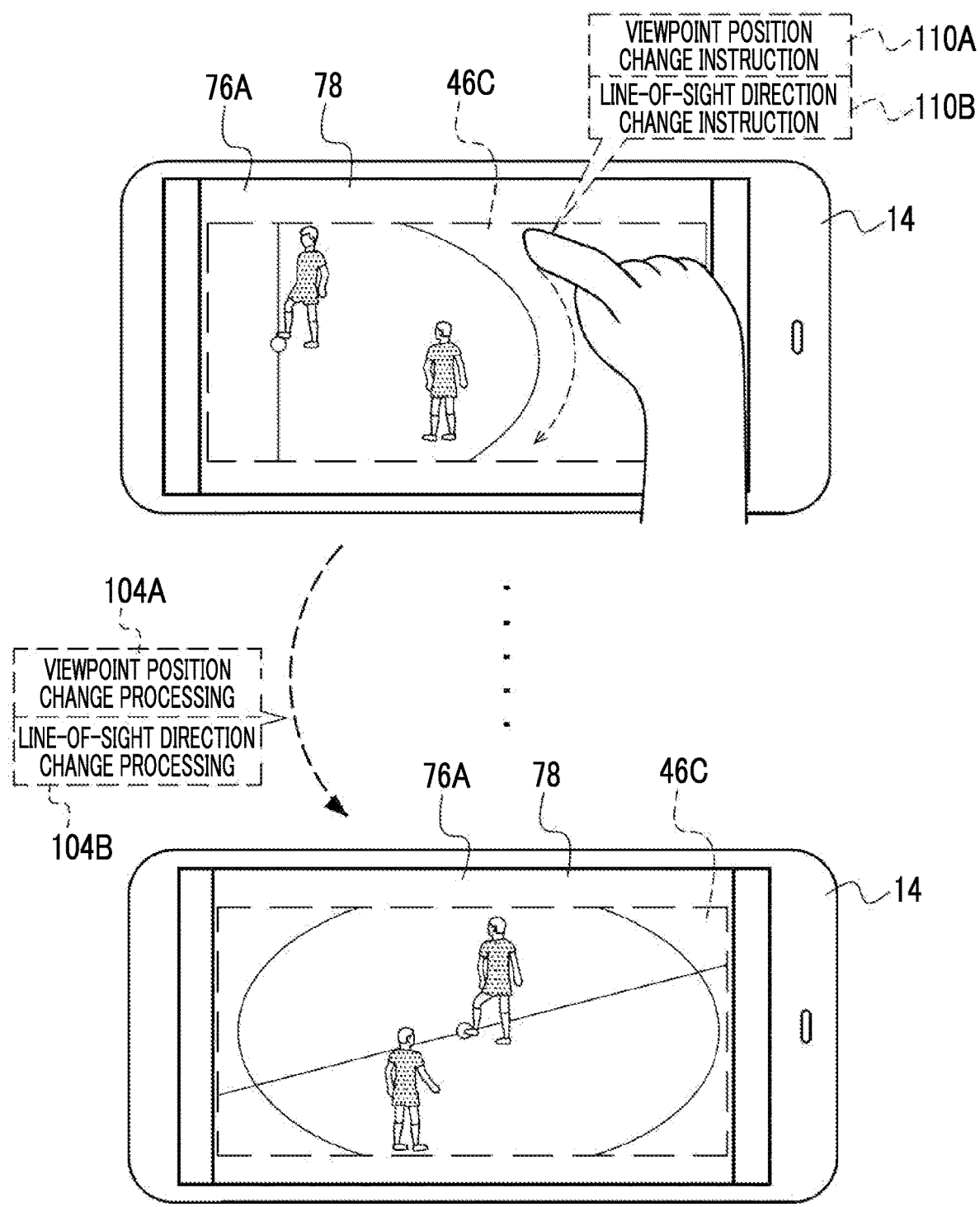
FIG. 13 is a conceptual diagram provided for illustrating an example of an instruction method of a viewpoint position change instruction and a line-of-sight direction change instruction, and viewpoint position change processing and line-of-sight direction change processing.

As shown in FIG. 13 as an example, the viewer 28 can also give the line-of-sight direction change instruction 110B to the smart device 14 together with the viewpoint position change instruction 110A. The line-of-sight direction change instruction 110B is an instruction for changing the line-of-sight direction 44 of the virtual viewpoint video 46C. In order to give the line-of-sight direction change instruction 110B to the smart device 14, for example, the viewer 28 slides his/her finger on the touch panel 76A in a curved line. As shown in the upper part of FIG. 13, the viewer 28 slides his/her finger on the touch panel 76A in the direction of a dotted arrow, whereby the viewpoint position change instruction 110A is received by the touch panel 76A.

The virtual viewpoint video 46C displayed on the smart device 14 drawn in the upper part of FIG. 13 is a video obtained by being captured in a line-of-sight direction 44C by the virtual imaging device disposed at a viewpoint position 42C. In a case where the viewpoint position 42C of the virtual imaging device is moved to a viewpoint position 42D and the line-of-sight direction 44C of the virtual imaging device is changed to a line-of-sight direction 44D, the viewer 28 performs a swipe operation of continuously sliding his/her finger in the direction opposite to the movement direction of the viewpoint position on the touch panel 76A, to give the viewpoint position change instruction 110A and the line-of-sight direction change instruction 110B to the smart device 14.

Figure 14:
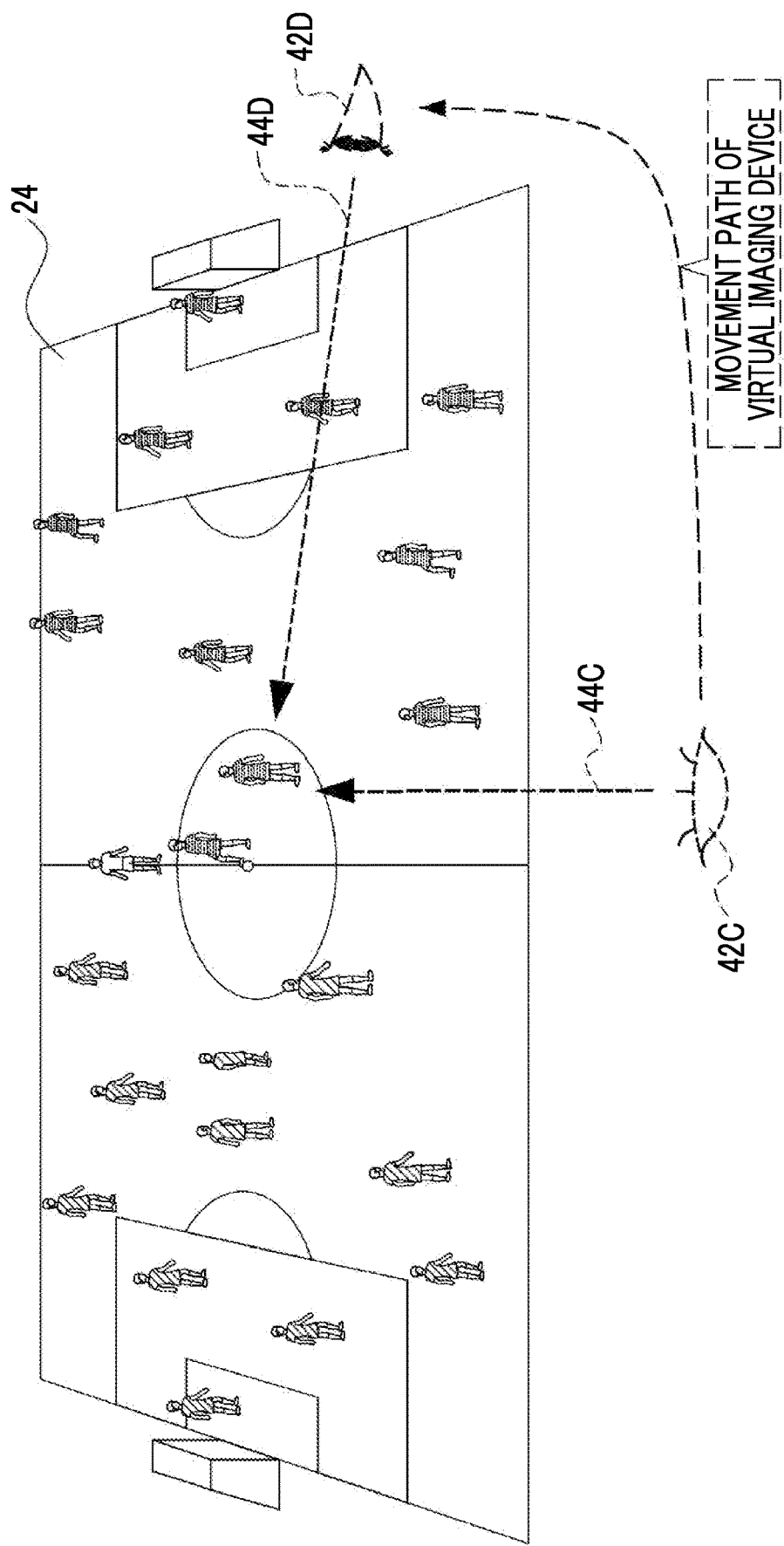
FIG. 14 is a conceptual diagram provided for illustrating an example of the camera path of the virtual imaging device in the viewpoint position change processing and the line-of-sight direction change processing.

In this way, in a case where the viewpoint position change instruction 110A and the line-of-sight direction change instruction 110B are given to the smart device 14, the viewpoint position change processing 104A and the line-of-sight direction change processing 104B are performed by the virtual viewpoint video generation unit 104. With this, as shown in FIG. 14 as an example, the viewpoint position of the virtual imaging device is changed from the viewpoint position 42C to the viewpoint position 42D, and the line-of-sight direction of the virtual imaging device is changed from the line-of-sight direction 44C to the line-of-sight direction 44D. The virtual viewpoint video 46C generated using the viewpoint position 42D and the line-of-sight direction 44D as a reference by the virtual viewpoint video generation unit 104 is obtained by being virtually captured in the line-of-sight direction 44D by the virtual imaging device disposed at the viewpoint position 42D.

Figure 15:
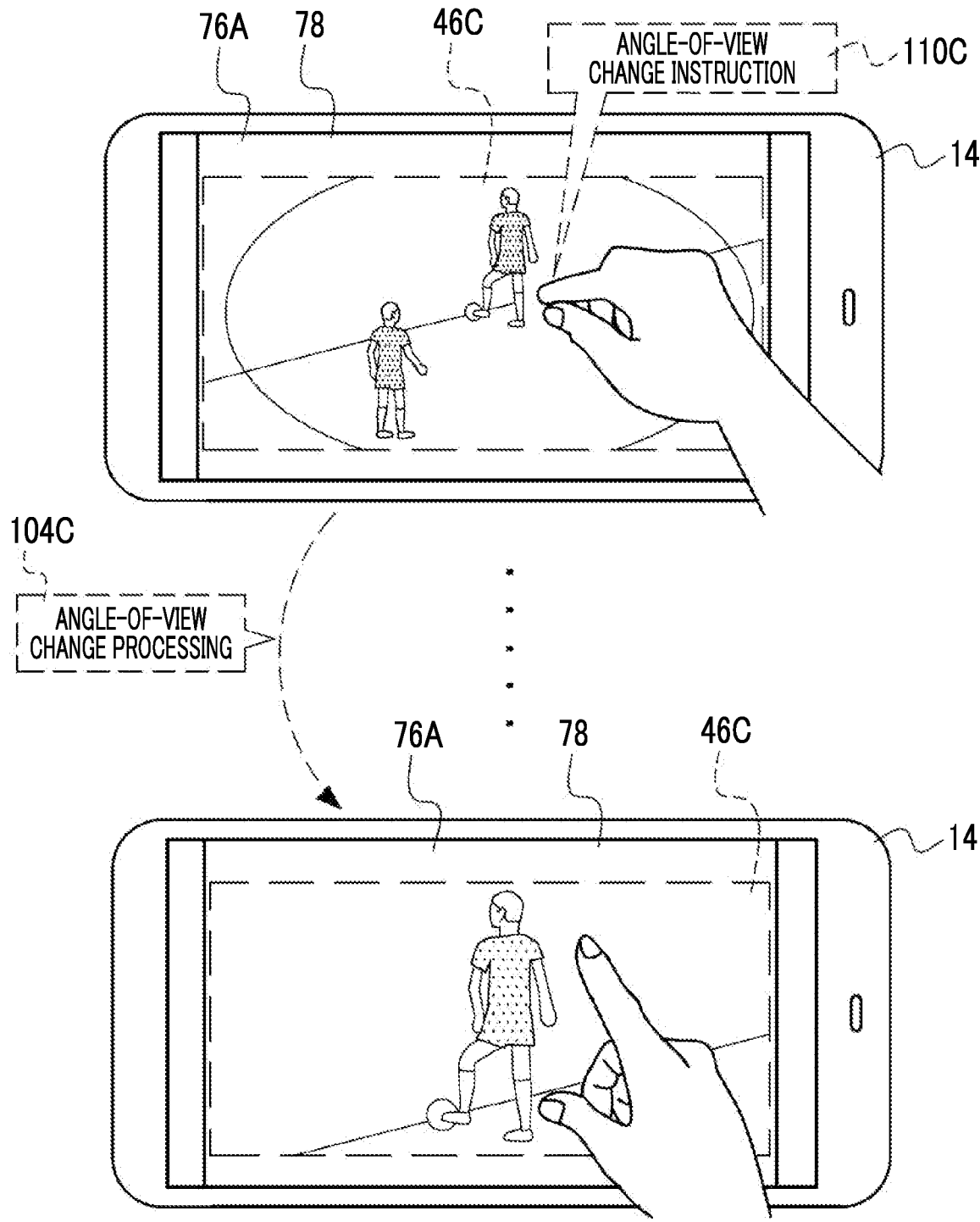
FIG. 15 is a conceptual diagram provided for illustrating an example of an instruction method of an angle-of-view change instruction and angle-of-view change processing.
Figure 16:
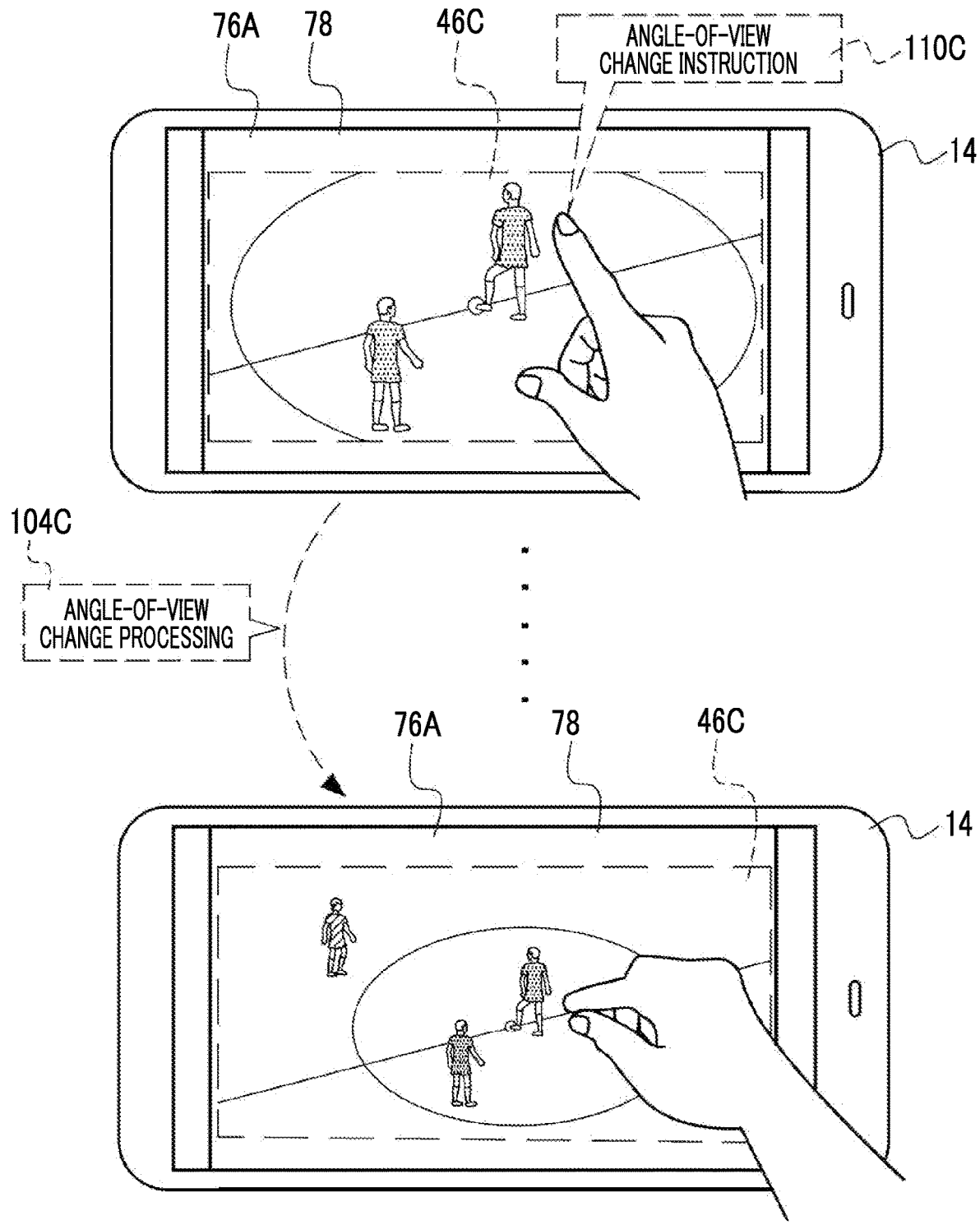
FIG. 16 is a conceptual diagram provided for illustrating another example of the instruction method of the angle-of-view change instruction and the angle-of-view change processing.

As shown in FIGS. 15 and 16 as an example, the angle-of-view change instruction 110C is an instruction for changing the angle of view 43 of the virtual viewpoint video 46C. In order to give the angle-of-view change instruction 110C to the smart device 14, the viewer 28 performs a pinch-in operation of pinching in the screen with two fingers, or a pinch-out operation of pinching out the screen from the state in which the screen is pinched in, on the touch panel 76A. The pinch-out operation is performed in a case where the angle of view is narrowed, and the pinch-in operation is performed in a case where the angle of view is widened.

In the example shown in FIG. 15, the viewer 28 performs the pinch-out operation on the touch panel 76A on which the virtual viewpoint video 46C is displayed. The viewer 28 performs the pinch-out operation on the touch panel 76A to give an instruction to narrow the angle of view to the smart device 14 as the angle-of-view change instruction 110C. In this way, the instruction to narrow the angle of view is given to the smart device 14 as the angle-of-view change instruction 110C, whereby the angle-of-view change processing 104C corresponding to the pinch-out operation is performed by the virtual viewpoint video generation unit 104 as described above. The angle-of-view change processing 104C corresponding to the pinch-out operation is performed by the virtual viewpoint video generation unit 104, whereby the virtual viewpoint video 46C is generated by the virtual viewpoint video generation unit 104 such that the angle of view is narrowed in accordance with the pinch-out operation as shown in FIG. 15 as an example.

In the example shown in FIG. 16, the viewer 28 performs the pinch-in operation on the touch panel 76A on which the virtual viewpoint video 46C is displayed. The viewer 28 performs the pinch-in operation on the touch panel 76A to give an instruction to widen the angle of view to the smart device 14 as the angle-of-view change instruction 110C. In this way, the instruction to widen the angle of view is given to the smart device 14 as the angle-of-view change instruction 110C, whereby the angle-of-view change processing 104C corresponding to the pinch-in operation is performed by the virtual viewpoint video generation unit 104 as described above. The angle-of-view change processing 104C corresponding to the pinch-in operation is performed by the virtual viewpoint video generation unit 104, whereby the virtual viewpoint video 46C is generated by the virtual viewpoint video generation unit 104 such that the angle of view is widened in accordance with the pinch-in operation as shown in FIG. 16 as an example.

Next, an example of the flow of the reference video generation processing, the virtual viewpoint video generation processing, and the video distribution processing that are performed by the information processing apparatus 12 will be described with reference to FIGS. 17 to 19.

Figure 17:
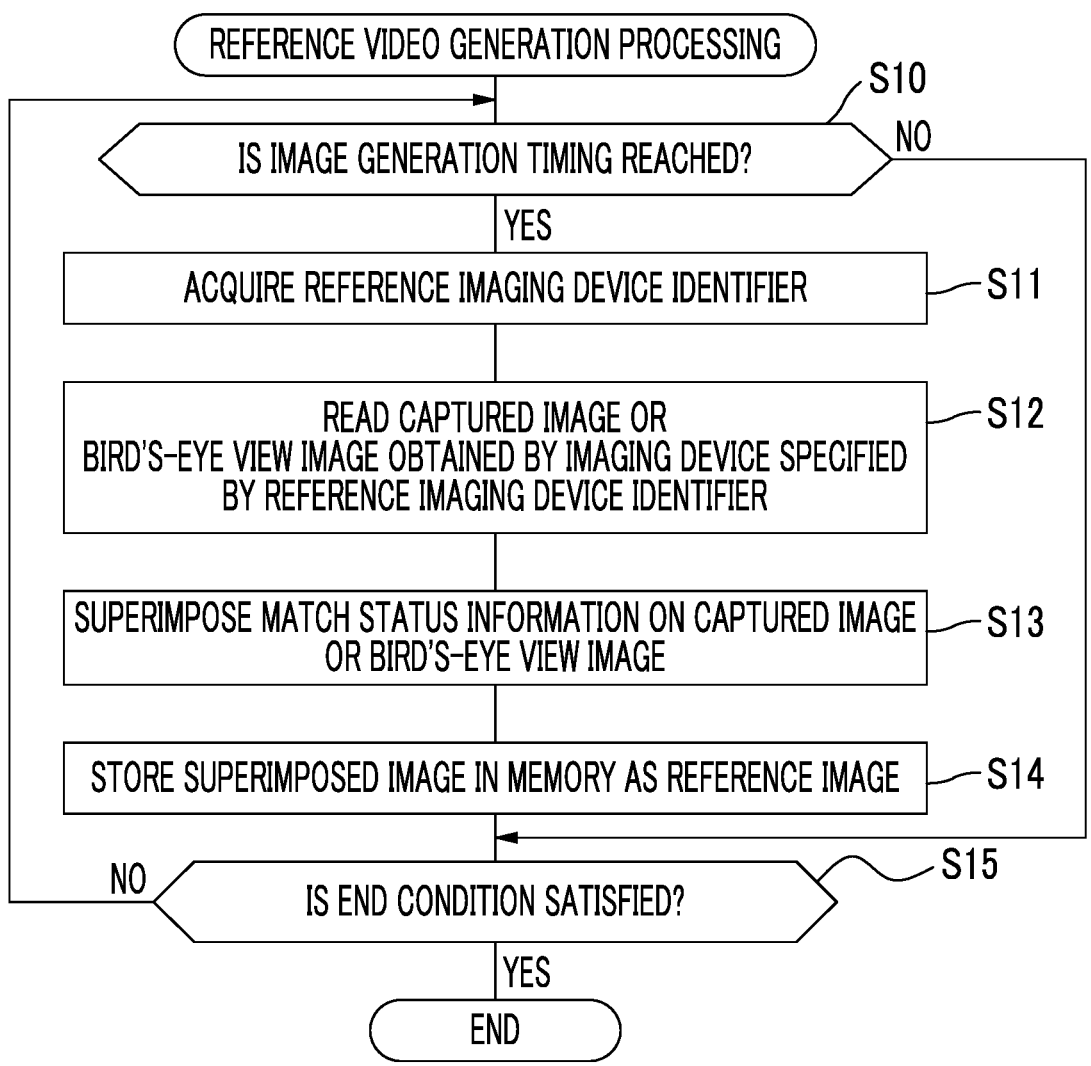
FIG. 17 is a flowchart showing an example of a flow of the reference video generation processing performed by a reference video generation unit.

The reference video generation processing shown in FIG. 17 as an example is executed by the CPU 58 in accordance with the reference video generation processing program 60A in a case where an instruction to execute the reference video generation processing is received by the reception device 52.

In the reference video generation processing shown in FIG. 17, first, in step S10, the control unit 100 determines whether or not the image generation timing is reached. An example of the image generation timing includes a timing defined in accordance with the frame rate. For example, in a case where the frame rate of the information processing apparatus 12 is 30 fps, the image generation timing is reached every $\frac{1}{30}$ seconds. In a case where the image generation timing is not reached in step S10, a negative determination is made and the reference video generation processing proceeds to step S15. In a case where the image generation timing is reached in step S10, an affirmative determination is made and the reference video generation processing proceeds to step S11.

In step S11, the control unit 100 acquires the reference imaging device identifier 35. The reference imaging device identifier 35 is an identifier for designating one of the plurality of imaging devices, and is irregularly received, for example, by the operation of the video producer through the reception device 52 and is overwritten and stored in the memory 62. The control unit 100 acquires the reference imaging device identifier 35 received at the nearest timing, from the memory 62. After that, the reference video generation processing proceeds to step S12.

In step S12, the control unit 100 reads out, from the memory 62, the imaging device specified by the reference imaging device identifier 35, that is, the captured image or the bird's-eye view image for one frame obtained by being captured by the reference imaging device 17, and outputs the captured image or the bird's-eye view image to the reference video generation unit 102. After that, the reference video generation processing proceeds to step S13.

In step S13, the reference video generation unit 102 superimposes the match status information on the captured image or the bird's-eye view image obtained by being captured by the reference imaging device 17, to generate the reference image for one frame. The match status information includes, for example, scores, player information, and/or the remaining time of the match. After that, the reference video generation processing proceeds to step S14.

In step S14, the reference video generation unit 102 causes the memory 62 to store the reference image for one frame generated in step S13. After that, the reference video generation processing proceeds to step S15.

In step S15, the control unit 100 determines whether or not a condition of ending the reference video generation processing (hereinafter, referred to as a "reference video generation processing end condition") is satisfied. An example of the reference video generation processing end condition includes a condition that an instruction to end the generation of the reference video 46D is received by the reception device 52 (see FIG. 3). In a case where the reference video generation processing end condition is not satisfied in step S15, a negative determination is made and the reference video generation processing proceeds to step S10. In a case where the reference video generation processing end condition is satisfied in step S15, an affirmative determination is made and the reference video generation processing ends.

Figure 18:
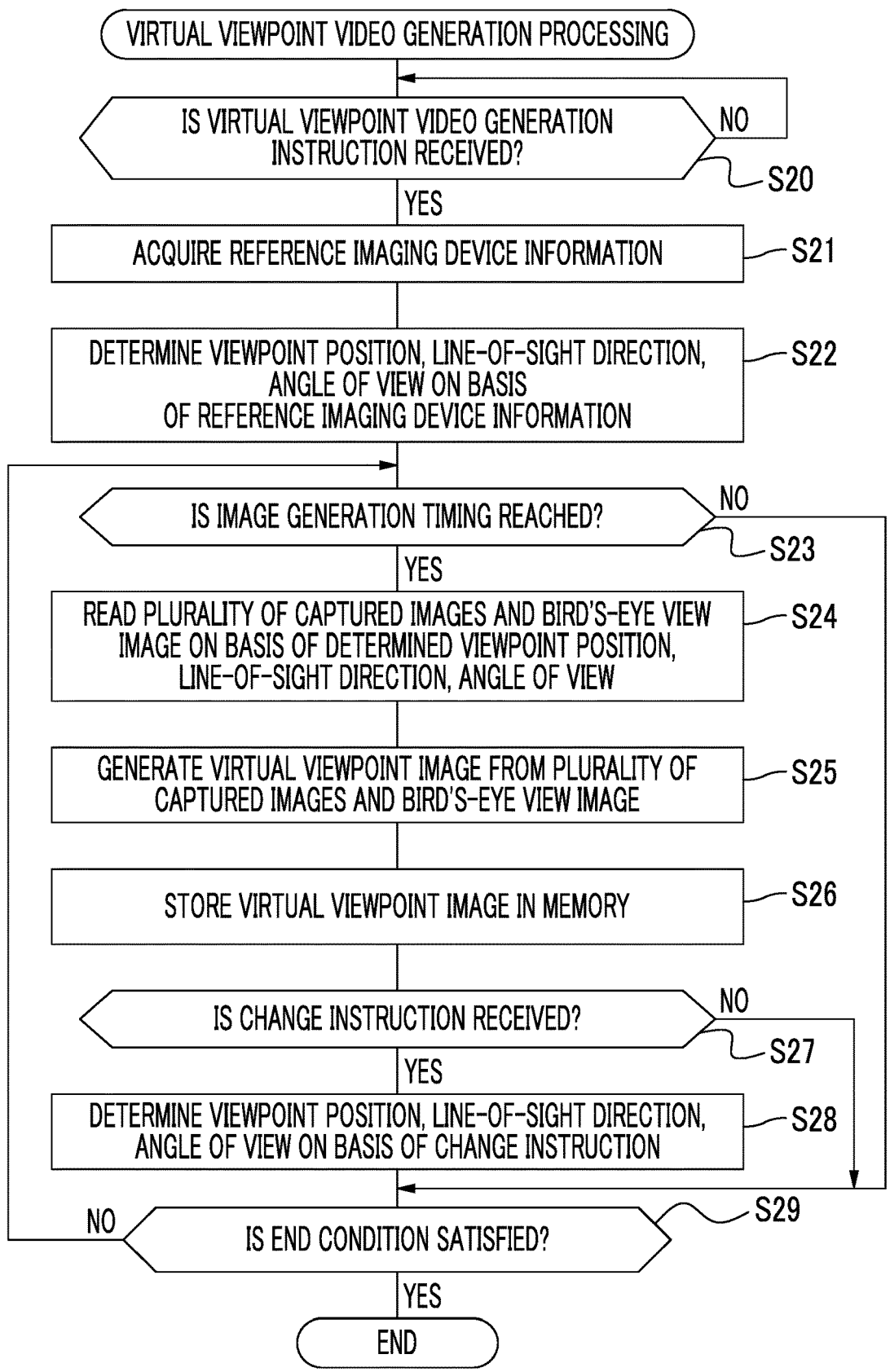
FIG. 18 is a flowchart showing an example of a flow of the virtual viewpoint video generation processing performed by a virtual viewpoint video generation unit.

The virtual viewpoint video generation processing shown in FIG. 18 as an example is executed by the CPU 58 in accordance with the virtual viewpoint video generation processing program 60B in a case where the virtual viewpoint video generation instruction 107 is received by the touch panel 76A of the smart device 14.

In the virtual viewpoint video generation processing shown in FIG. 18, first, in step S20, the control unit 100 determines whether or not the virtual viewpoint video generation instruction 107 is received by the touch panel 76A of the smart device 14. In a case where the virtual viewpoint video generation instruction 107 is not received by the touch panel 76A of the smart device 14 in step S20, a negative determination is made and the determination in step S20 is performed again. In a case where the virtual viewpoint video generation instruction 107 is received by the touch panel 76A of the smart device 14 in step S20, an affirmative determination is made and the virtual viewpoint video generation processing proceeds to step S21. It should be noted that step S20 may be a step performed after step S22, and specifically, step S20 may be placed between step S22 and step S23.

In step S21, the control unit 100 reads out the reference imaging device information 46E from the memory 62. The reference imaging device information 46E is information corresponding to the position, the imaging direction, and the angle of view of the reference imaging device 17. After that, the virtual viewpoint video generation processing proceeds to step S22.

In step S22, the control unit 100 determines the viewpoint position 42, the line-of-sight direction 44, and the angle of view 43 of the virtual imaging device by using the reference imaging device information 46E as a reference. For example, the control unit 100 determines the viewpoint position 42, the line-of-sight direction 44, and the angle of view 43 of the virtual imaging device such that the visual field of the image obtained by the virtual imaging device matches the visual field of the image obtained by the reference imaging device 17. After that, the reference video generation processing proceeds to step S23.

In step S23, the control unit 100 determines whether or not the image generation timing is reached. In a case where the image generation timing is not reached in step S23, a negative determination is made and the virtual viewpoint video generation processing proceeds to step S29. In a case where the image generation timing is reached in step S23, an affirmative determination is made and the virtual viewpoint video generation processing proceeds to step S24.

In step S24, the control unit 100 reads out the plurality of original images from the memory 62 on the basis of the viewpoint position 42, the line-of-sight direction 44, and the angle of view 43 determined in step S22. That is, the control unit 100 reads out, from the memory 62, the plurality of original images required for generating the virtual viewpoint video 46C of the visual field defined by the viewpoint position 42, the line-of-sight direction 44, and the angle of view 43, and outputs the plurality of original images to the virtual viewpoint video generation unit 104. After that, the virtual viewpoint video generation processing proceeds to step S25.

In step S25, the virtual viewpoint video generation unit 104 generates the virtual viewpoint image for one frame of the visual field defined by the viewpoint position 42, the line-of-sight direction 44, and the angle of view 43 determined in step S22, from the plurality of original images. That is, the virtual viewpoint video generation unit 104 generates the virtual viewpoint image having the same visual field as the reference image. After that, the virtual viewpoint video generation processing proceeds to step S26.

In step S26, the virtual viewpoint video generation unit 104 causes the memory 62 to store the virtual viewpoint image for one frame generated in step S25. After that, the virtual viewpoint video generation processing proceeds to step S27.

In step S27, the control unit 100 determines whether or not the change instruction 110 is received by the smart device 14. In a case where the change instruction 110 is not received by the smart device 14 in step S27, a negative determination is made and the virtual viewpoint video generation processing proceeds to step S29. In a case where the change instruction 110 is received by the smart device 14 in step S27, an affirmative determination is made and the virtual viewpoint video generation processing proceeds to step S28.

In step S28, the control unit 100 determines the viewpoint position 42, the line-of-sight direction 44, and the angle of view 43 of the virtual imaging device on the basis of the change instruction 110. That is, the viewpoint position 42, the line-of-sight direction 44, and the angle of view 43 determined in step S22 are discarded, and the viewpoint position 42, the line-of-sight direction 44, and the angle of view 43 determined in step S28 become effective. That is, in step S25, the virtual viewpoint image for one frame of the visual field defined by the viewpoint position 42, the line-of-sight direction 44, and the angle of view 43 determined in step S28 is generated. After the processing of step S28 is executed, the virtual viewpoint video generation processing proceeds to step S29.

In step S29, the control unit 100 determines whether or not a condition of ending the virtual viewpoint video generation processing (hereinafter, referred to as a "virtual viewpoint video generation processing end condition") is satisfied. An example of the virtual viewpoint video generation processing end condition includes a condition that an instruction to end the generation of the virtual viewpoint video 46C is received by the reception device 52 (see FIG. 3). In a case where the virtual viewpoint video generation processing end condition is not satisfied in step S29, a negative determination is made and the virtual viewpoint video generation processing proceeds to step S23. In a case where the virtual viewpoint video generation processing end condition is satisfied in step S29, an affirmative determination is made and the virtual viewpoint video generation processing ends.

Figure 19:
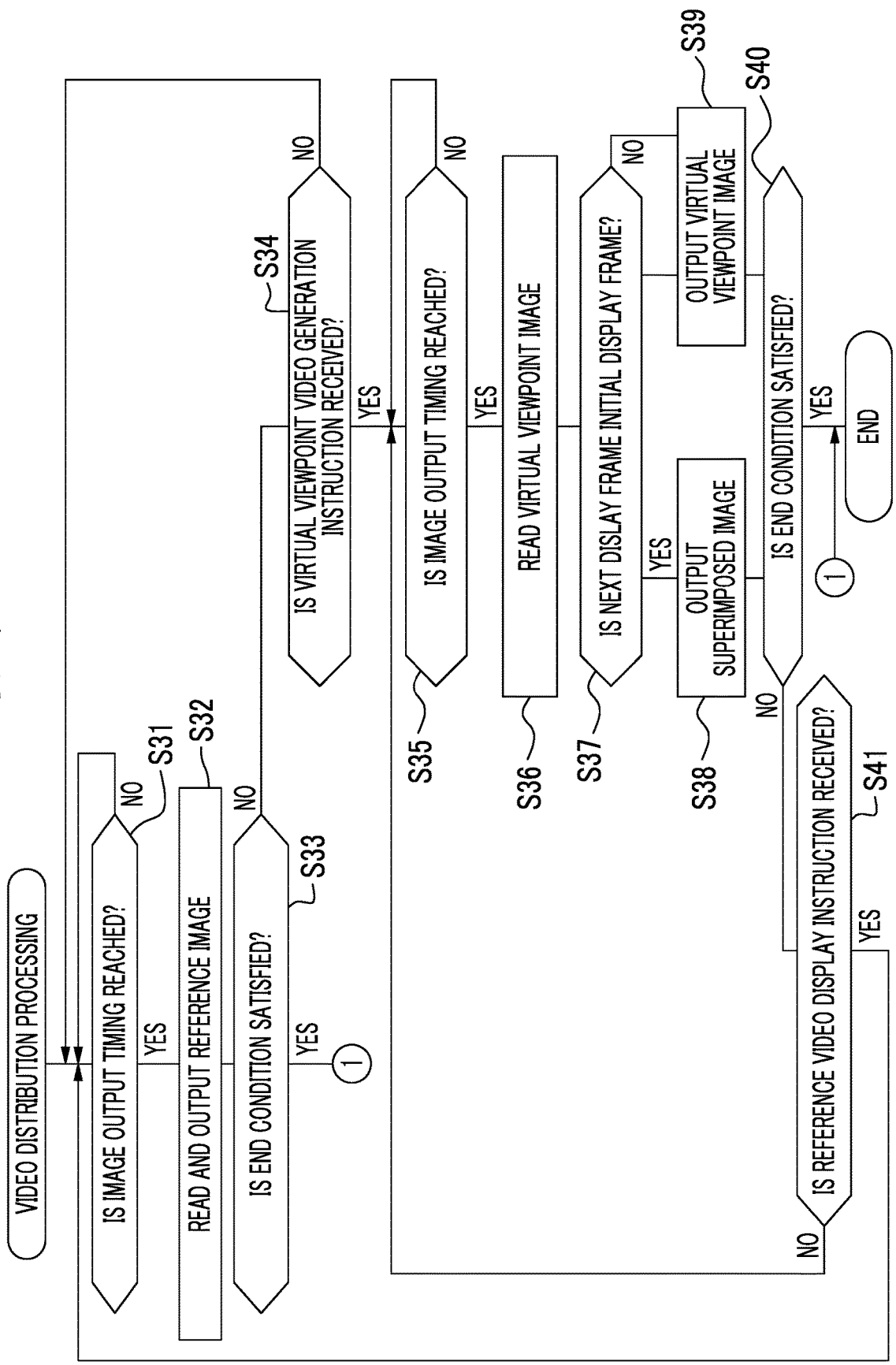
FIG. 19 is a flowchart showing an example of a flow of video distribution processing performed by a control unit.

The video distribution processing shown in FIG. 19 as an example is executed by the CPU 58 in accordance with the video distribution processing program 60C in a case where the instruction to start executing the video distribution processing is received by the touch panel 76A of the smart device 14.

In the video distribution processing shown in FIG. 19, first, in step S31, the control unit 100 determines whether or not the image output timing is reached. An example of the image output timing includes a timing divided by a time interval defined by the output frame rate. In step S31, in a case where the image output timing is not reached, a negative determination is made and the determination of step S31 is performed again. In step S31, in a case where the image output timing is reached, an affirmative determination is made and the video distribution processing proceeds o step S32.

In step S32, the control unit 100 reads out the reference image for one frame from the memory 62 and outputs the reference image to the smart device 14. After that, the video distribution processing proceeds to step S33.

In step S33, the control unit 100 determines whether or not a condition of ending the video distribution processing (hereinafter, referred to as a "video distribution processing end condition") is satisfied. An example of the video distribution processing end condition includes a condition that the instruction to end the video distribution processing is received by the reception device 52 or 76. In a case where the video distribution processing end condition is not satisfied in step S33, a negative determination is made and the video distribution processing proceeds to step S34. In a case where the video distribution processing end condition is satisfied in step S33, an affirmative determination is made and the video distribution processing ends.

In step S34, the control unit 100 determines whether or not the virtual viewpoint video generation instruction 107 is received by the touch panel 76A of the smart device 14. In a case where the virtual viewpoint video generation instruction 107 is not received by the touch panel 76A of the smart device 14 in step S34, a negative determination is made and the video distribution processing proceeds to step S31. In a case where the virtual viewpoint video generation instruction 107 is received by the touch panel 76A of the smart device 14 in step S34, an affirmative determination is made and the video distribution processing proceeds to step S35.

In step S35, the control unit 100 determines whether or not the image output timing is reached. In a case where the image output timing is not reached in step S35, a negative determination is made and the determination of step S35 is performed again. In a case where the image output timing is reached in step S35, an affirmative determination is made and the video distribution processing proceeds to step S36.

In step S36, the control unit 100 reads out the virtual viewpoint image for one frame from the memory 62. After that, the video distribution processing proceeds to step S37.

In step S37, the control unit 100 determines whether or not the next display frame is an initial display frame shortly after receiving the virtual viewpoint video generation instruction 107. For example, in a case where the next frame is the Nth display frame (N is a natural number of 1 or more) and the number thereof is smaller than a specific number of frames (for example, 30) (N<30), an affirmative determination is made and the video distribution processing proceeds to step S38. On the other hand, in a case where the next display frame is the Nth display frame and the number thereof is a specific number or more (N≥30), a negative determination is made and the video distribution processing proceeds to step S39. The specific number of frames is described as "30", but the technique of the present disclosure is not limited thereto, and the specific number of frames may be set to any number among natural numbers.

In step S38, the control unit 100 generates the superimposed image in which the virtual viewpoint image is superimposed on the reference image, and outputs the generated superimposed image to the smart device 14. After that, the video distribution processing proceeds to step S40.

In step S39, the control unit 100 outputs the virtual viewpoint image for one frame read out in step S36 to the smart device 14. After that, the video distribution processing proceeds to step S40.

In step S40, the control unit 100 determines whether or not a condition of ending the video distribution processing (hereinafter, referred to as a "video distribution processing end condition") is satisfied. An example of the video distribution processing end condition includes a condition that the video distribution application is ended. In a case where the video distribution processing end condition is not satisfied in step S40, a negative determination is made and the video distribution processing proceeds to step S41. In a case where the video distribution processing end condition is satisfied in step S40, an affirmative determination is made and the video distribution processing ends.

In step S41, the control unit 100 determines whether or not the reference video generation instruction 109 is received by the touch panel 76A of the smart device 14. In a case where the reference video generation instruction 109 is not received by the touch panel 76A of the smart device 14 in step S41, a negative determination is made and the video distribution processing proceeds to step S35. In a case where the reference video generation instruction 109 is received by the touch panel 76A of the smart device 14 in step S41, an affirmative determination is made and the video distribution processing proceeds to step S31.

As described above, the information processing apparatus 12 comprises the CPU 58 and the memory 62 connected to or incorporated in the CPU 58. The CPU 58 acquires the reference imaging device information 46E corresponding to the position, the imaging direction, and the angle of view of the reference imaging device 17. Further, the CPU 58 generates the virtual viewpoint video 46C by using the reference imaging device information 46E as a reference, on a condition that the virtual viewpoint video generation instruction 107 that is an instruction to start generating the virtual viewpoint video 46C based on the plurality of original videos is given. Therefore, the virtual viewpoint video 46C having a visual field equal to or close to the reference imaging device information 46E is generated. According to the present configuration, a difference in visual field between the reference video 46D and the virtual viewpoint video 46C can be reduced as compared with a case where the virtual viewpoint video 46C is generated on the basis of the position, the imaging direction, and the angle of view of the imaging device 16 or 18 different from the reference imaging device 17 among the plurality of imaging devices.

Further, in a case where the reference imaging device information 46E is continuously transmitted by the reference imaging device 17, the CPU 58 generates the virtual viewpoint video 46C by using, as a reference, the reference imaging device information 46E transmitted from the reference imaging device 17, on a condition that the virtual viewpoint video generation instruction 107 is given. Since the reference imaging device 17 continuously transmits the reference imaging device information 46E, the CPU 58 can acquire the reference imaging device information 46E in a short time to generate the virtual viewpoint video 46C after the CPU 58 is given the virtual viewpoint video generation instruction 107, as compared with a case where the reference imaging device 17 does not continuously transmit the reference imaging device information 46E. Further, since the CPU 58 generates the virtual viewpoint video 46C on a condition that the virtual viewpoint video generation instruction 107 is given, the communication load and the power consumption required for generating the virtual viewpoint video 46C can be reduced as compared with a case where the CPU 58 always generates the virtual viewpoint video 46C.

Further, the CPU 58 updates the reference imaging device information 46E each time the CPU 58 acquires the reference imaging device information 46E. Therefore, the CPU 58 can switch the reference imaging device information 46E in response to the input of the reference imaging device identifier 35, as compared with a case where the reference imaging device information 46E is not updated.

Further, the CPU 58 acquires image quality information 46F indicating the image quality of the reference video 46D obtained by imaging the soccer field 24 with the reference imaging device 17. Furthermore, the CPU 58 determines the image quality of the virtual viewpoint video 46C on the basis of the image quality information 46F on a condition that the virtual viewpoint video generation instruction 107 is given. Therefore, the CPU 58 generates the virtual viewpoint video 46C having an image quality based on the image quality information 46F. According to the present configuration, the difference in image quality between the reference video 46D and the virtual viewpoint video 46C can be reduced as compared with a case where the image quality of the virtual viewpoint video 46C is not decided on the basis of the image quality information 46F of the reference video 46D.

Further, the CPU 58 outputs, to the smart device 14, the superimposed video 46G in which the virtual viewpoint video 46C is superimposed on the reference video 46D obtained by imaging the soccer field 24 with the reference imaging device 17, on a condition that the virtual viewpoint video generation instruction 107 is given. Therefore, since the visual field of the virtual viewpoint image to be generated is equal to or close to the visual field of the reference image, the virtual viewpoint image is superimposed on the reference image without having a difference in visual field. According to the present configuration, since the superimposed video 46G is output when the display from the reference video 46D to the virtual viewpoint video 46C is switched, a visual discomfort given to the viewer 28 can be reduced as compared with a case where the superimposed video 46G is not output.

The CPU 58 gradually changes the superimposition ratio between the reference video 46D and the virtual viewpoint video 46C in the superimposed video 46G. Therefore, the display can be gradually changed from the reference video 46D to the virtual viewpoint video 46C. According to the present configuration, a visual discomfort given to the viewer 28 can be reduced as compared with a case where the reference video 46D and the virtual viewpoint video 46C are always superimposed at a constant ratio when the display is switched from the reference video 46D to the virtual viewpoint video 46C.

The CPU 58 outputs the virtual viewpoint video 46C to the display 78 of the smart device 14, and receives the change signal 120 for continuously changing at least one of the viewpoint position 42, the line-of-sight direction 44, or the angle of view 43 in the output virtual viewpoint video 46C. According to the present configuration, since at least one of the viewpoint position 42, the line-of-sight direction 44, or the angle of view 43 is continuously changed by the change signal 120, a realistic effect in the virtual viewpoint video 46C can be enhanced as compared with a case where the viewpoint position 42, the line-of-sight direction 44, and the angle of view 43 are not continuously changed.

The reference imaging device 17 is an imaging device capable of changing at least one of the position, the imaging direction, or the angle of view. Therefore, the degree of freedom of imaging of the reference video 46D can be enhanced as compared with a case where the position, the imaging direction, and the angle of view of the reference imaging device 17 cannot be changed.

The CPU 58 acquires the reference imaging device information 46E on the basis of the reference video 46D obtained by imaging the soccer field 24 with the reference imaging device 17. Therefore, the reference imaging device information 46E can be easily acquired as compared with a case where the reference imaging device information 46E is not acquired on the basis of the reference video 46D.

The reference imaging device information 46E is the position, the imaging direction, and the angle of view of the reference imaging device 17. Therefore, the difference in visual field between the reference video 46D and the virtual viewpoint video 46C can be further reduced as compared with a case where the reference imaging device information 46E is not the position, the imaging direction, and the angle of view of the reference imaging device 17.

The reference imaging device 17 is one of the plurality of imaging devices. Therefore, the degree of freedom in setting which imaging device is set as the reference imaging device 17 can be increased as compared with a case where the reference imaging device 17 is not one of the plurality of imaging devices.

The reference imaging device 17 can be switched between the plurality of imaging devices. Therefore, the degree of freedom in designing which imaging device is set as the reference imaging device 17 can be increased as compared with a case where the reference imaging device 17 cannot be switched.

The CPU 58 outputs the reference video 46D obtained by imaging the soccer field 24 with the reference imaging device 17, and generates the virtual viewpoint video 46C corresponding to the reference video 46D by using the reference imaging device information 46E as a reference on a condition that the virtual viewpoint video generation instruction 107 is given. Therefore, the virtual viewpoint video 46C having the same visual field as the reference imaging device information 46E is generated. According to the present configuration, the difference in visual field between the reference video 46D and the virtual viewpoint video 46C can be reduced as compared with a case where the virtual viewpoint video 46C that does not correspond to the reference video 46D is generated.

In the above embodiment, a description has been given using, as an example, an aspect in which the plurality of imaging devices continuously transmit imaging device information, but the technique of the present disclosure is not limited thereto. For example, the imaging device information may be continuously transmitted by a server (not shown). In this case, the server is an example of the "transmission device" according to the technique of the present disclosure. The server holds imaging device information of the plurality of imaging devices. Then, the control unit 100 receives the imaging device information transmitted from the server and causes the memory 62 to store the imaging device information.

Further, the plurality of imaging devices continuously transmit the imaging device information in the above embodiment, but the plurality of imaging devices may transmit the imaging device information to the control unit 100 in response to the transmission request from the control unit 100. That is, the control unit 100 may make a transmission request for the imaging device information only to the reference imaging device 17, and the reference imaging device 17 may transmit the own imaging device information thereof as the reference imaging device information 46E in response to the transmission request.

Further, the memory 62 stores the imaging device information of the plurality of imaging devices in the above embodiment, but the control unit 100 may cause the memory 62 or the server to store only the imaging device information of the reference imaging device 17 as the reference imaging device information 46E. In this case, since the reference imaging device 17 is changed depending on the operation of the video producer, the reference imaging device information 46E held in the memory 62 or the server is updated each time the control unit 100 acquires the reference imaging device identifier 35, that is, each time the control unit 100 acquires the reference imaging device information 46E. The control unit 100 acquires the reference imaging device information 46E held in the server or the memory 62.

Further, the control unit 100 acquires the reference imaging device information 46E from the imaging device information transmitted by the plurality of imaging devices in the above embodiment, but the control unit 100 may acquire the reference imaging device information 46E on the basis of the reference video 46D. In this case, for example, the soccer field 24 is provided with a mark indicating the distance from the reference position for each predetermined distance. In the soccer field 24, for example, marks indicating the distance X in the longitudinal direction and the distance Y in the transverse direction of the soccer field 24 in the form of (X,Y) with the center of the soccer field 24 as a reference position (0,0) are provided in a lattice shape at a constant interval. Alternatively, in each of the four walls surrounding the soccer field 24, marks indicating the distance X in the horizontal direction and the distance Y in the vertical direction from the reference position in the form of (X,Y) with the middle in the longitudinal direction of the wall and the ground as the reference position (0,0) are provided in a lattice shape at a constant interval. The control unit 100 detects the marks from the reference video 46D, so that the control unit 100 can specify the visual field of the reference imaging device 17 and geometrically acquire the reference imaging device information 46E on the basis of the specified visual field.

In the above embodiment, a description has been given using, as an example, an aspect in which the reference video 46D is generated by the information processing apparatus 12, but the technique of the present disclosure is not limited thereto. The reference video 46D may be generated by an apparatus different from the information processing apparatus 12 (hereinafter, referred to as a "video generation apparatus").

Although a description has been given using the display 78 of the smart device 14 as an example of the "display" according to the technique of the present disclosure, various devices with a display, such as a head up display, a head mounted display, a personal computer and/or a wearable terminal, instead of the smart device 14 can also be adopted as the "display" according to the technique of the present disclosure.

Further, the soccer stadium 22 has been described as an example in the above embodiment, but the soccer stadium 22 is merely an example, and any place may be used as long as a plurality of imaging devices and a plurality of sound collection devices can be installed as in a baseball field, a rugby field, a curling field, an athletic field, a swimming field, a concert hall, an outdoor music field, a theater venue, and the like.

Further, the wireless communication method using the base station 20 has been described as an example in the above embodiment, but the wireless communication method is merely an example, and the technique of the present disclosure is established even with the wired communication method using a cable.

Further, the unmanned aerial vehicle 27 has been described as an example in the above embodiment, but the technique of the present disclosure is not limited thereto, and the imaging region may be imaged by the imaging device 18 suspended by a wire (for example, a self-propelled imaging device that is movable along the wire).

Further, the computers 50 and 70 have been described as an example in the above embodiment, but the technique of the present disclosure is not limited thereto. For example, a device including an ASIC, an FPGA, and/or a PLD may be applied instead of the computers 50 and/or 70. Alternatively, a combination of a hardware configuration and a software configuration may be used instead of the computers 50 and/or 70.

Figure 20:
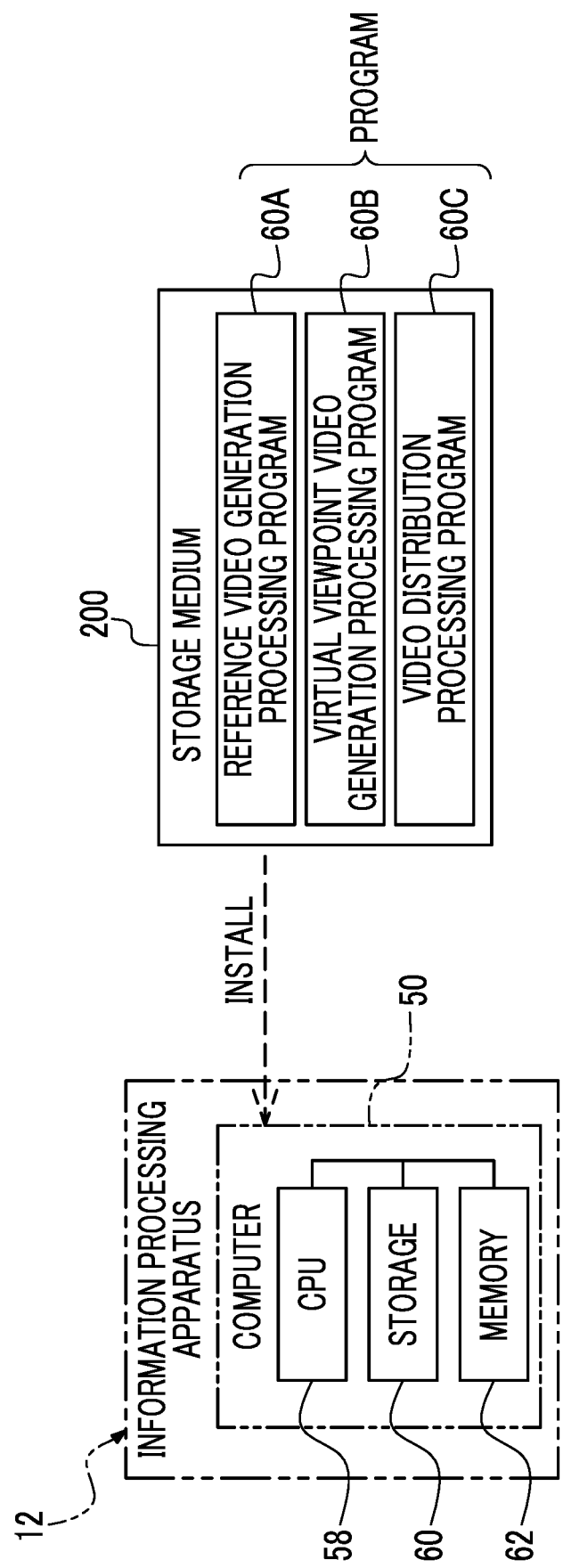
FIG. 20 is a block diagram showing an example of an aspect in which an information processing apparatus-side program is installed on a computer of the information processing apparatus from a storage medium storing the information processing apparatus-side program.

Further, the storage 60 stores the information processing apparatus-side program in the above embodiment, but the technique of the present disclosure is not limited thereto, and any portable storage medium 200, such as an SSD or a USB memory, may store the information processing apparatus-side program as shown in FIG. 20 as an example. In this case, the information processing apparatus-side program stored in the storage medium 200 is installed on the computer 50, and the CPU 58 executes information processing apparatus-side processing in accordance with the information processing apparatus-side program.

Alternatively, the information processing apparatus-side program may be stored in a storage unit of, for example, another computer or a server device connected to the computer 50, through a communication network (not shown), and the information processing apparatus-side program may be downloaded on the information processing apparatus 12 in response to a request from the information processing apparatus 12. In this case, the information processing apparatus-side processing based on the downloaded information processing apparatus-side program is executed by the CPU 58 of the computer 50.

Further, the CPU 58 has been described as an example in the above embodiment, but the technique of the present disclosure is not limited thereto, and a GPU may be adopted. Alternatively, a plurality of CPUs or a combination of a CPU and a GPU may be adopted instead of the CPU 58. That is, the information processing apparatus-side processing may be executed by one processor or a plurality of physically separated processors. Further, a GPU may be adopted instead of the CPU 88, or a plurality of CPUs or a combination of a CPU and a GPU may be adopted, or various kinds of processing may be executed by one processor or a plurality of physically separated processors.

As a hardware resource for executing the information processing apparatus-side processing, the following various processors can be used. Examples of the processor include, as described above, a CPU, which is a general-purpose processor that functions as the hardware resource for executing the information processing apparatus-side processing in accordance with software, that is, the program. Examples of another processor include a dedicated electric circuit, which is a processor having a dedicated circuit configuration designed to execute specific processing, such as an FPGA, a PLD, or an ASIC. A memory is incorporated in or connected to any processor, and any processor uses the memory to execute the information processing apparatus-side processing.

The hardware resource for executing the information processing apparatus-side processing may be constituted of one of these various processors, or a combination of two or more processors of the same type or different types (for example, a combination of a plurality of FPGAs, or a combination of a CPU and an FPGA). Alternatively, the hardware resource for executing the information processing apparatus-side processing may be one processor.

A first example in which the hardware resource for executing the information processing apparatus-side processing is constituted of one processor is an aspect in which one or more CPUs and software are combined to constitute one processor and the processor functions as the hardware resource for executing the information processing apparatus-side processing. The aspect is typified by a computer such as a client and a server. A second example is an aspect in which a processor that realizes all the functions of a system including a plurality of hardware resources for executing the information processing apparatus-side processing with one IC chip is used. The aspect is typified by an SoC or the like. As described above, the information processing apparatus-side processing is realized by using one or more of the above-described various processors as a hardware resource.

Furthermore, more specifically, electric circuitry in which circuit elements such as semiconductor elements are combined can be used as the hardware structure of these various processors.

Further, the above-mentioned processing on the information processing apparatus 12 side is merely an example. Accordingly, it goes without saying that unnecessary steps may be deleted, new steps may be added, or the processing order may be rearranged without departing from the gist.

The contents described and shown above are detailed descriptions for parts related to the technique of the present disclosure, and are merely an example of the technique of the present disclosure. For example, the description of the configurations, functions, operations, and effects is the description of an example of the configurations, functions, operations, and effects of parts related to the technique of the present disclosure. Therefore, it goes without saying that unnecessary elements may be deleted, new elements may be added, or the replacements may be made for the contents described and shown above without departing from the gist of the technique of the present disclosure. In addition, in order to avoid complications and facilitate understanding of the parts related to the technique of the present disclosure, in the contents described and shown above, descriptions of common general knowledge and the like that do not require special descriptions for enabling the implementation of the technique of the present disclosure are omitted.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An information processing apparatus comprising:
   a processor; and
   a memory that is connected to or incorporated in the processor,
   wherein the processor
   acquires reference imaging device information corresponding to a position, an imaging direction, and an angle of view of a reference imaging device, and on a condition that an instruction to start generating a virtual viewpoint image based on a plurality of images obtained by imaging an imaging region with a plurality of imaging devices is given,
   generates the virtual viewpoint image by using the reference imaging device information as a reference, wherein a position, an imaging direction, and an angle of view of the virtual viewpoint image match the position, the imaging direction, and the angle of view of the reference imaging device.

2. The information processing apparatus according to claim 1, wherein in a case where the reference imaging device information is continuously transmitted by a transmission device, the processor is configured to generate the virtual viewpoint image by using, as a reference, the reference imaging device information transmitted from the transmission device, on a condition that the instruction is given.

3. The information processing apparatus according to claim 1, wherein the processor is configured to update the reference imaging device information each time the processor acquires the reference imaging device information.

4. The information processing apparatus according to claim 1, wherein the processor is configured to
   acquire image quality information indicating an image quality of a first reference image obtained by imaging the imaging region with the reference imaging device, and
   determine an image quality of the virtual viewpoint image on the basis of the image quality information on a condition that the instruction is given.

5. The information processing apparatus according to claim 1, wherein the processor is configured to output a superimposed image in which the virtual viewpoint image is superimposed on a second reference image obtained by imaging the imaging region with the reference imaging device, on a condition that the instruction is given.

6. The information processing apparatus according to claim 5, wherein the processor is configured to gradually change a ratio between the second reference image and the virtual viewpoint image in the superimposed image.

7. The information processing apparatus according to claim 1, wherein the processor is configured to
   output the virtual viewpoint image to a display, and
   receive a change signal for continuously changing at least one of a viewpoint position, a line-of-sight direction, or an angle of view in the output virtual viewpoint image.

8. The information processing apparatus according to claim 1,
   wherein the reference imaging device is an imaging device capable of changing at least one of the position, the imaging direction, or the angle of view.

9. The information processing apparatus according to claim 1, wherein the processor is configured to acquire the reference imaging device information on the basis of a third reference image obtained by imaging the imaging region with the reference imaging device.

10. The information processing apparatus according to claim 1,
    wherein the reference imaging device information is the position, the imaging direction, and the angle of view of the reference imaging device.

11. The information processing apparatus according to claim 1,
    wherein the reference imaging device is one of the plurality of imaging devices.

12. The information processing apparatus according to claim 11,
    wherein the reference imaging device is capable of being switched between the plurality of imaging devices.

13. The information processing apparatus according to claim 1, wherein the processor is configured to
- output a fourth reference image obtained by imaging the imaging region with the reference imaging device,
- acquire the reference imaging device information, and
- generate a virtual viewpoint image corresponding to the fourth reference image by using the reference imaging device information as a reference, on a condition that the instruction is given.

14. A method of operating an information processing apparatus including a processor and a memory connected to or incorporated in the processor, the method comprising:
- acquiring reference imaging device information corresponding to a position, an imaging direction, and an angle of view of a reference imaging device; and
- on a condition that an instruction to start generating a virtual viewpoint image based on a plurality of images obtained by imaging an imaging region with a plurality of imaging devices is given, generating the virtual viewpoint image by using the reference imaging device information as a reference, wherein, a position, an imaging direction, and an angle of view of the virtual viewpoint image match the position, the imaging direction, and the angle of view of the reference imaging device.

* * * * *